US008495561B2

(12) United States Patent
Iwamasa

(10) Patent No.: US 8,495,561 B2
(45) Date of Patent: Jul. 23, 2013

(54) APPARATUS AND METHOD FOR DESIGNING A SYSTEM SPECIFICATION FOR TESTABILITY

(75) Inventor: Mikito Iwamasa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 931 days.

(21) Appl. No.: 12/612,250

(22) Filed: Nov. 4, 2009

(65) Prior Publication Data

US 2010/0131917 A1 May 27, 2010

(30) Foreign Application Priority Data

Nov. 25, 2008 (JP) .................................. 2008-299849

(51) Int. Cl.
*G06F 9/44* (2006.01)
*G06F 17/50* (2006.01)
*G06F 7/00* (2006.01)

(52) U.S. Cl.
USPC ............... 717/104; 717/105; 703/14; 703/16; 703/21; 703/22; 707/794; 707/795; 707/796

(58) Field of Classification Search
None
See application file for complete search history.

(56) References Cited

U.S. PATENT DOCUMENTS

| | | | |
|---|---|---|---|
| 6,289,502 B1 * | 9/2001 | Garland et al. ............... 717/104 |
| 6,473,757 B1 * | 10/2002 | Garofalakis et al. ................... 1/1 |
| 6,681,383 B1 * | 1/2004 | Pastor et al. .................... 717/126 |
| 8,370,808 B2 * | 2/2013 | Ohta et al. ..................... 717/124 |
| 2004/0049295 A1 * | 3/2004 | Wojsznis et al. ................. 700/28 |
| 2004/0172638 A1 * | 9/2004 | Larus et al. .................... 719/328 |
| 2005/0097364 A1 * | 5/2005 | Edeki et al. .................... 713/201 |
| 2005/0273771 A1 * | 12/2005 | Chang et al. ................... 717/136 |
| 2007/0168907 A1 * | 7/2007 | Iborra et al. ................... 717/100 |
| 2009/0132995 A1 * | 5/2009 | Iborra et al. ................... 717/106 |

OTHER PUBLICATIONS

Luca de Alfaro, et al., "Interface Automata", In Proc. of the Joint 8th European Software Engineering Conference and 9th ACM SIGSOFT International Symposium on the Foudations of Software Engineering (ESEC/FSE 01), 2001, 12 pages.
Colin Campbell, et al., "Model-based Testing of Object-Oriented Reactive Systems with Spec Explorer", Technical Report MSR-TR-2005-59, Microsoft Research, May 2005, 35 pages.

* cited by examiner

*Primary Examiner* — Henry Tsai
*Assistant Examiner* — Michael Sun
(74) *Attorney, Agent, or Firm* — Oblon, Spivak, McClelland, Maier & Neustadt, L.L.P.

(57) ABSTRACT

As to a plurality of components in a system, a state transition path covering transitions defined by a behavioral specification of a component is specified to satisfy an input restriction of the component. Action sequences are acquired from the state transition path. By selecting a pair of components connected in the system, it is verified whether an output action sequence of a first component as one of the pair satisfies an input restriction of a second component as the other of the pair. If unsatisfied, the input restriction of the second component is relaxed to satisfy the output action sequence of the first component, or an input restriction of the first component is tightened to acquire a new output action sequence satisfying the input restriction of the second component. Above processing is repeated for each pair of components, so that output action sequences of one and the other of a pair satisfies input restrictions of the other and the one of the pair respectively.

11 Claims, 19 Drawing Sheets

| INITIAL STATE =IdolMode | LOCAL VARIABLE tgtSpeedSet=false | | | |
|---|---|---|---|---|
| PREVIOUS STATE | GUARD CONDITION | INPUT ACTION | OUTPUT ACTION | NEXT STATE |
| IdolMode | - | eon | - | InitialMode |
| InitialMode | - | eoff | tgtSpeedSet=false | IdolMode |
| InitialMode | - | brakeoff | - | CruiseOffMode |
| InitialMode | tgtSpeedSet=true | Resume | activate | CruiseMode |
| CruiseOffMode | - | accel | - | AccingMode |
| CruiseOffMode | - | brakeon | deactivate | InitialMode |
| CruiseOffMode | - | eoff | tgtSpeedSet=false | IdolMode |
| AccingMode | - | accel | - | AccingMode |
| AccingMode | tgtSpeedSet=false | Cruise | activate<br>tgtSpeedSet=true | CruiseMode |
| AccingMode | tgtSpeedSet=true | Resume | activate | CruiseMode |
| AccingMode | tgtSpeedSet=true | RDS | tgtSpeedSet=false | AccingMode |
| AccingMode | - | eoff | tgtSpeedSet=false | IdolMode |
| CruiseMode | - | accel | deactivate | AccingMode |
| CruiseMode | - | brakeon | deactivate | InitialMode |

FIG. 3

| INITIAL STATE = IdolMode | | | | |
|---|---|---|---|---|
| PREVIOUS STATE | CONDITION | INPUT ACTION | OUTPUT ACTION | NEXT STATE |
| IdolMode | - | EngineOn | eon | NormalMode |
| NormalMode | - | EngineOff | eoff | IdolMode |
| NormalMode | - | activate | - | CruiseMode |
| NormalMode | - | accelOn | accel | NormalMode |
| NormalMode | - | deactivate | - | NormalMode |
| CruiseMode | - | deactivate | - | NormalMode |
| CruiseMode | - | EngineOff | eoff | Idolmode |
| CruiseMode | - | accelOn | accel | CruiseMode |

FIG. 5

| INITIAL STATE = BrakeOnMode | | | | |
|---|---|---|---|---|
| PREVIOUS STATE | CONDITION | INPUT ACTION | OUTPUT ACTION | NEXT STATE |
| BrakeOnMode | - | BrakeReleased | brakeoff | BrakeOffMode |
| BrakeOffMode | - | BrakePushed | brakeon | BrakeOnMode |

FIG. 6

| INITIAL STATE = (IdoMode, BrakeOnMode) = (I,ON) | | | |
|---|---|---|---|
| (I,ON) | – | EngineOn | eon | (N,ON) |
| (I,ON) | – | BrakeReleased | brakeoff | (I,OFF) |
| (N,ON) | – | BrakeReleased | brakeoff | (N,OFF) |
| (N,ON) | – | EngineOff | eoff | (I,ON) |
| (N,ON) | – | activate | – | (C,ON) |
| (N,ON) | – | AccelOn | accel | (N,ON) |
| (I,OFF) | – | EngineOn | eon | (N,OFF) |
| (I,OFF) | – | BrakePushed | brakeon | (I,ON) |
| (N,OFF) | – | BrakePushed | brakeon | (N,ON) |
| (N,OFF) | – | EngineOff | eoff | (I,OFF) |
| (N,OFF) | – | activate | – | (C,OFF) |
| (N,OFF) | – | AccelOn | accel | (N,OFF) |
| (C,OFF) | – | BrakePushed | brakeon | (C,ON) |
| (C,OFF) | – | deactivate | – | (N,OFF) |
| (C,OFF) | – | AccelOn | accel | (C,OFF) |
| (C,ON) | – | BrakeReleased | brakeoff | (C,OFF) |
| (C,ON) | – | deactivate | – | (N,ON) |
| (C,ON) | – | AccelOn | accel | (C,ON) |

FIG. 11

APPARATUS AND METHOD FOR DESIGNING A SYSTEM SPECIFICATION FOR TESTABILITY

CROSS-REFERENCE TO RELATED APPLICATIONS

This application is based upon and claims the benefit of priority from Japanese Patent Application No. 2008-299849, filed on Nov. 25, 2008; the entire contents of which are incorporated herein by reference.

FIELD OF THE INVENTION

The present invention relates to an apparatus and a method for designing a system specification for testability in a system having a plurality of components as a hardware or a software.

BACKGROUND OF THE INVENTION

Recently, in proportion to increase of development scale of a software increases, the software need be developed in a short term and extended in series. Accordingly, it is difficult to create the software having high quality. As a means for solving this problem, the software is componentalized as a plurality of components. By reusing each component, design productivity rises. This technique is disclosed in "Interface automata", Alfaro, L. and Henzinger, T. A. ACM SIGSOFT Software Engineering Notes, 26:55, 109-120, 2001 (Non-patent reference 1).

On the other hand, by regarding a behavioral specification as a model, technique to generate a test case from the model is developed as a model driven test technique (Hereinafter, MDT). In case of generating a test case, quality of the test case is controlled by an input restriction supplied for the behavioral specification. For example, if the input restriction is tightened, the number of test cases to be tested reduces. In reverse case, the number of test cases increases. Briefly, MDT has correlative relationship between the input restriction and the test case generated. This technique is disclosed in "Model-based testing of object-oriented reactive systems with Spec Explorer", Campbell, C. and Grieskamp, W. and Nachmanson, L. and Schulte, W. and Tillmann, N. and Veanes, Microsoft Research MSR-TR-2005-59, May, 2005 (Non-patent reference 2).

As to componentalization of software according to the prior art, an interface of each component is taken into consideration, and characteristics of the interface is defined. In order to maintain a high quality of components, by using the characteristics of the interface, the components are designed with (so-called) agreement base between the components. In this technique, a connection between two components can be supplemented. However, causality between an input and an output of each component is not clear. Accordingly, in case of installing each component into an entire system, it is difficult to verify and correct a consistency of the behavioral specification between adjacent components. Furthermore, when a new behavior is generated by combining components, a restriction of the behavior cannot be processed.

On the other hand, as to the model driven test, by converting the specification to a state transition machine and searching the state transition machine, a test case is generated. However, when a scale of the object system becomes large, a state explosion occurs. Especially, in a distributed system operating in parallel, a problem of state explosion is remarkable. Accordingly, model driven-development is applied to a component unit of small scale, i.e., a unit test, only.

SUMMARY OF THE INVENTION

The present invention is directed to an apparatus and a method for designing a system specification for testability by verifying and correcting a consistency between adjacent components in the system specification.

According to an aspect of the present invention, there is provided an apparatus for designing a system specification for testability, comprising: a first storage unit configured to store the system specification describing a connection among a plurality of components in a system, and input and output actions of each component for another component or outside of the system; a second storage unit configured to store a behavioral specification of each component, describing a transition between states by an input action, and an output action occurred with the transition; a third storage unit configured to store an input restriction of each component, describing an occurrence order of the input action; an action sequence acquisition unit configured to specify a state transition path covering transitions defined by the behavioral specification of a component to satisfy the input restriction of the component, and acquire output action sequences from the state transition path; a selection unit configured to select a pair of components connected in the system; a verification unit configured to verify whether an output action sequence of a first component as one of the pair satisfies an input restriction of a second component as the other of the pair; an input restriction correction unit configured to, when the output action sequence of the first component does not satisfy the input restriction of the second component, relax the input restriction of the second component so that the output action sequence of the first component satisfies a relaxed input restriction of the second component, or tighten an input restriction of the first component so that a new output action sequence of the first component satisfies the input restriction of the second component; and a control unit configured to control the selection unit, the verification unit and the input restriction correction unit, for each pair of components in the system, so that output action sequences of one and the other of a pair satisfies input restrictions of the other and the one of the pair respectively.

BRIEF DESCRIPTION OF THE DRAWINGS

FIG. 3 is a schematic diagram of a state transition table showing a behavioral specification of a cruise controller.

FIG. 5 is a schematic diagram of a state transition table showing a behavioral specification of an engine controller.

FIG. 6 is a schematic diagram of a state transition table showing a behavioral specification of a brake controller.

FIG. 11 is a schematic diagram of a state transition table showing a behavioral specification of (the engine controller× the brake controller).

DETAILED DESCRIPTION OF THE EMBODIMENTS

Figure 1:
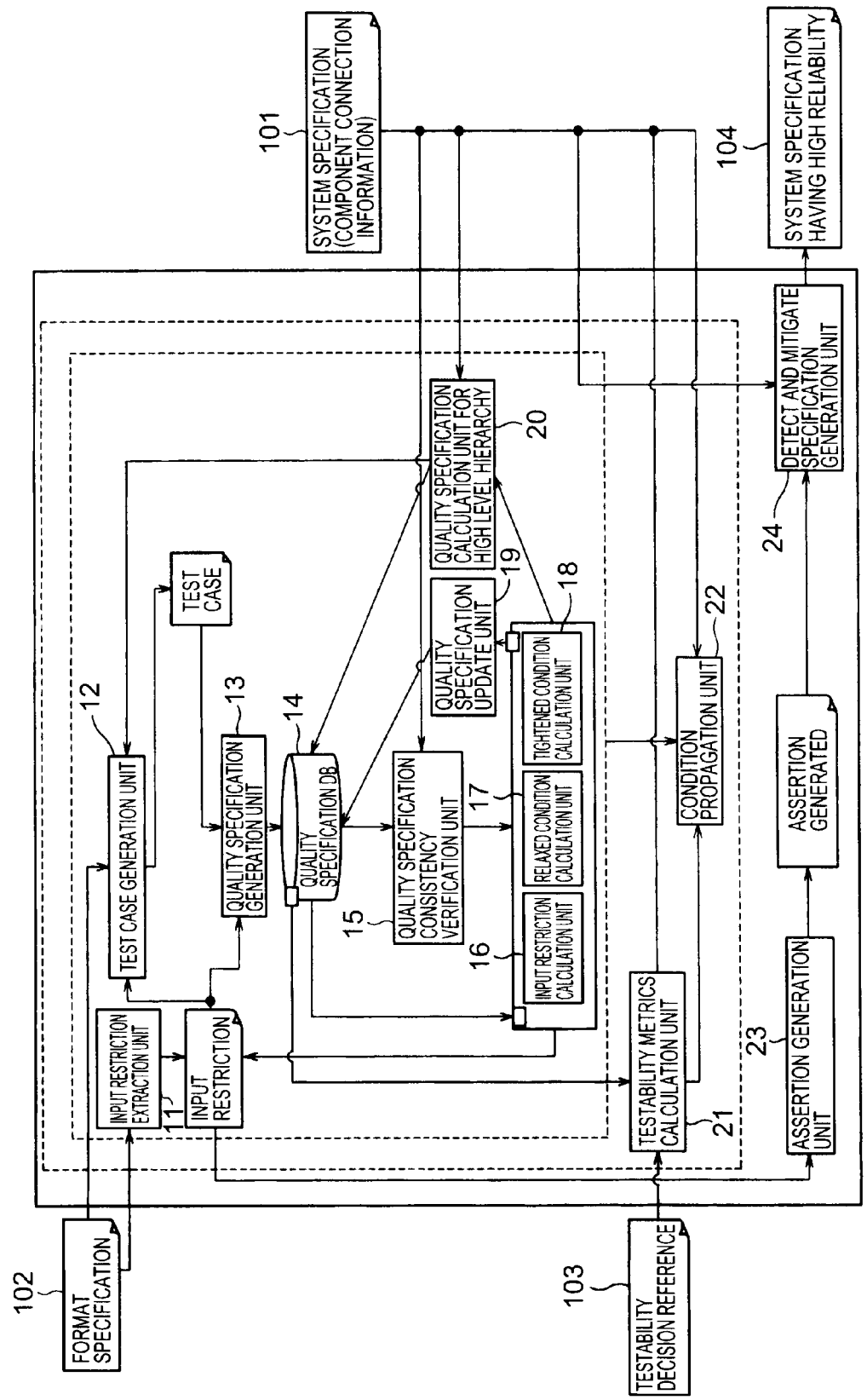
FIG. 1 is a block diagram of a design apparatus for testability according to one embodiment.

Hereinafter, embodiments of the present invention will be explained by referring to the drawings. The present invention is not limited to the following embodiments.

FIG. 1 is a block diagram of the apparatus for designing a system specification for testability according to one embodiment. This apparatus reads a system specification 101 of an object system and a format specification 102 including a behavioral specification of each component composing the object system, and receives as input data.

Figure 2:
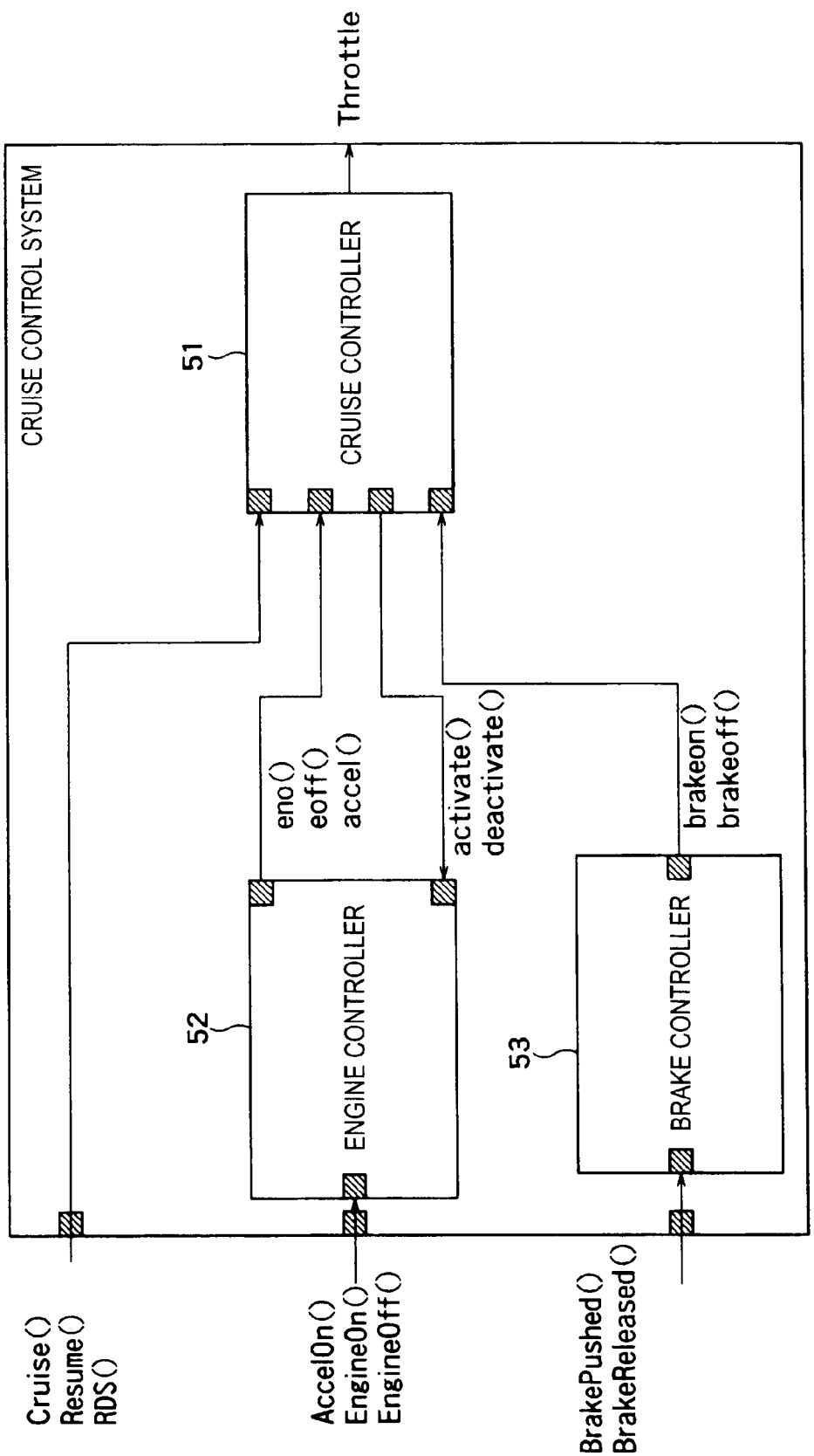
FIG. 2 is a block diagram of a cruise control system described in a system description.

FIG. 2 is a block diagram of a cruise control system as one example of the object system described in the system specification 101. The cruise control system includes a cruise controller 51, an engine controller 52 and a brake controller 53.

The cruise controller 51 receives each action of an engine-on (eon), an engine-off (eoff) and an accel-on (accel) from the engine controller 52. Furthermore, the cruise controller 51 receives each action of a brake-on (brakeon) and a brake-off (brakeoff) from the brake controller 53. The cruise controller 51 calculates based on actions received (inputted), outputs a throttle value (Throttle) to the outside of the cruise control system, and outputs each action of a cruise-activation (activate) and a cruise-deactivation (deactivate) to the engine controller 52. Furthermore, the cruise controller 51 receives each action of a cruise control-on (Cruise), a cruise-resume (Resume) and a cruise set-release (RDS) from the outside of the cruise control system.

The engine controller 52 receives each action of an engine-on (EngineOn), an engine-off (EngineOff) and an accel-on (AccelOn) from the outside of the cruise control system, calculates based on the actions, and outputs each action of an engine-on (eon), an engine-off (eoff) and an accel-on (accel).

The brake controller 53 receives each action of a brake-push (BrakePushed) and a brake-release (BrakeRelease) from the outside of the cruise control system, and outputs each action of a brake-on (brakeon) and a brake-off (brakeoff) to the cruise controller 51.

FIG. 3 is a state transition table showing a behavioral specification of the cruise controller 51. The cruise controller 51 has a local variable tgtSpeedSet={true, false} (tgtSpeedSet takes true or false). An initial value of the local variable is "tgeSpeedSet=false". An initial state of the cruise controller 51 is "IdolMode". Except for the initial state, the cruise controller 51 has following five states.

IdolMode, InitialMode, AccingMode, CruiseMode, CruiseOffMode,

The output action includes "activate" and "deactivate" to output to the outside module (the engine controller 52), and a value to set to the local variable tgtSpeedSet.

According to the behavioral specification described as the state transition table of FIG. 3, the cruise controller 51 executes transition of the state based on actions inputted from the outside, and outputs actions based on the transition. In the state transition table of FIG. 3, a specification of the state transition is represented as follows.

<previous state, guard condition, input action, output action, next state>

Under the condition that state="previous state", if "guard condition" is realized and "input action" occurs, "output action" is outputted and the state is transited to "nest state".

For example, assume that the cruise controller 51 is state of "AccingMode" and the local variable tgtSpeedSet is "true". When "Resume" action is received, "activate" action is outputted to the outside (the engine controller 52), and the state is transited to "CruiseMode". In the same way as the cruise controller 51, FIG. 5 is a state transition table showing a behavioral specification of the engine controller 52, and FIG. 6 is a state transition table showing a behavioral specification of the brake controller 53.

Figure 4:
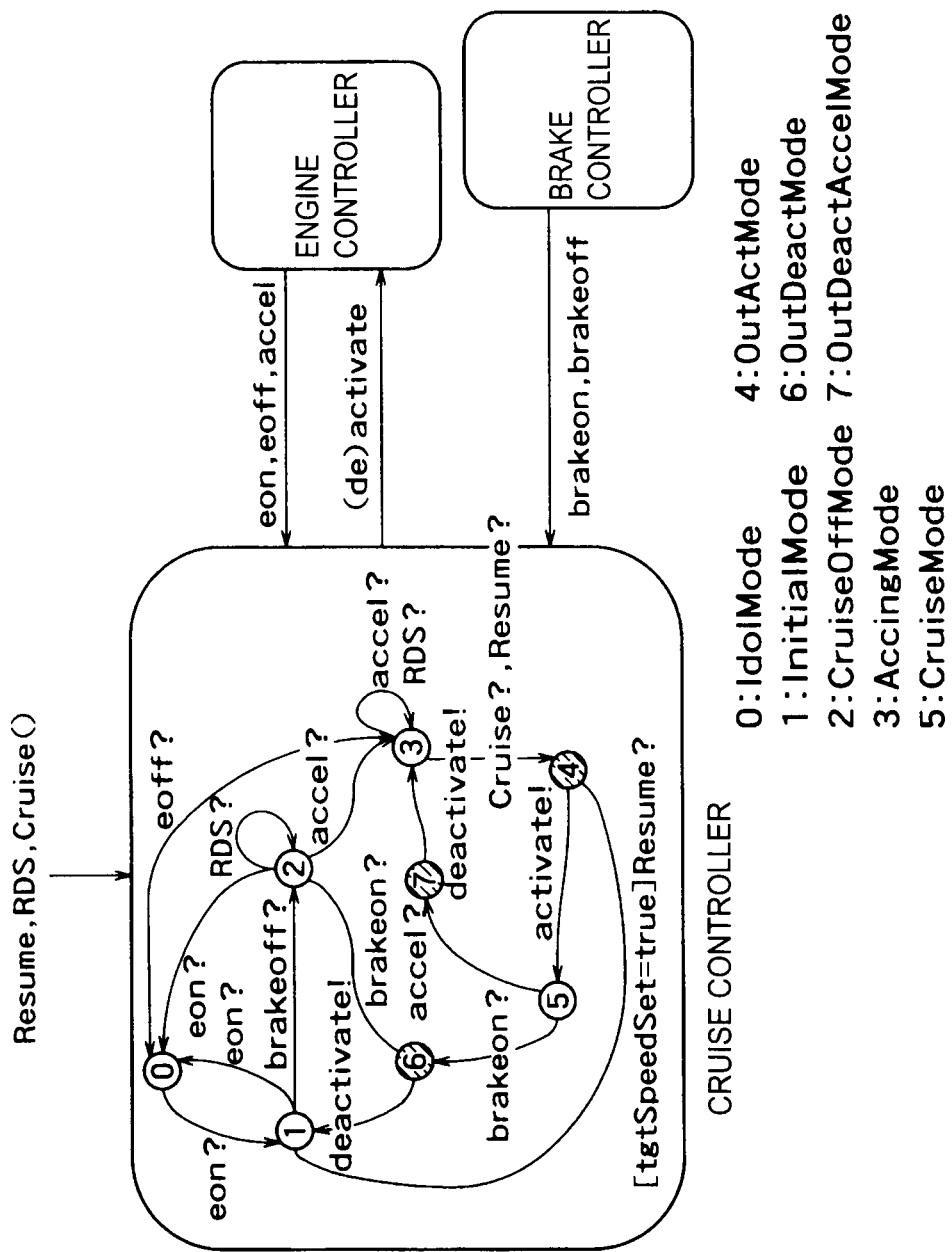
FIG. 4 is a schematic diagram of a transition chart showing the behavioral specification in FIG. 3.

Description format of the behavioral specification is not limited to the state transition table. All formats having the same description ability as the state transition table can be used. For example, FIG. 4 is a transition chart that a state is set as a node and a transition is set as an edge between nodes in the state transition table of FIG. 3. As to the node, numbers "0~7" are selectively assigned. The states (0, 1, 2, 3, 5) are same as each state in FIG. 3. The states (4, 6, 7) are conveniently added states to explicitly display the output action. Furthermore, "?" and "!" are respectively sign to discriminate the input action and the output action. An action having "?" added to the last of character sequence is the input action, and an action having "!" is the output action.

<Input Restriction Extraction Unit 11>

The input restriction extraction unit 11 extracts an input restriction of a component from the behavioral specification of each component. If the format specification 102 includes the input restriction of each component, the input restriction of the component is extracted from the format specification 102.

The input restriction of the component is a restriction between inputs in the specification of the component. As the input restriction, a range of value of the input restriction, and an appearance order of input actions (For example, "ack" is input after "req"), are used. In the present embodiment, the input restriction is mainly the appearance order between input actions. In case of the behavioral specification as the state transition table, the appearance order between input actions is acquired by deleting the output action from the state transition table. For example, by deleting the output action from the state transition table of FIG. 3, the input restriction extraction unit 11 acquires the input restriction shown in Table 1. In this case, an input restriction same as the input restriction extracted from the behavioral specification may be included in the format restriction 102 and extracted. Furthermore, an input restriction different from the input restriction extracted from the behavioral specification may be included in the format restriction 102 and extracted.

TABLE 1

Example of the input restriction (the cruise control unit 51)
INITIAL STATE = IdolMode LOCAL VARIABLE tgtSpeedSet = false

| PREVIOUS STATE | GUARD CONDITION | INPUT ACTION | NEXT STATE |
|---|---|---|---|
| IdolMode | — | eon | InitialMode |
| InitialMode | — | eoff | IdolMode |
| InitialMode | — | brakeoff | CruiseOffMode |
| InitialMode | tgtSpeedSet = true | Resume | CruiseMode |
| CruiseOffMode | — | accel | AccingMode |
| CruiseOffMode | — | brakeon | InitialMode |
| CruiseOffMode | — | eoff | IdolMode |
| AccingMode | — | accel | AccingMode |
| AccingMode | tgtSpeedSet = false | Cruise | CruiseMode |
| AccingMode | tgtSpeedSet = true | Resume | CruiseMode |
| AccingMode | tgtSpeedSet = true | RDS | AccingMode |
| AccingMode | — | eoff | IdolMode |
| CruiseMode | — | accel | AccingMode |
| CruiseMode | — | brakeon | InitialMode |

In this case, a pre-condition is defined. The pre-condition is a previous state to which the input action can transit in the state transition table. For example, in Table 1, the pre-condition of the input action "broken" is {CruiseOffMode, CruiseMode}.

The input restriction is not limited to ones acquired by deleting the output action from the state transition table, and ones given as the pre-condition. Briefly, appearance order of the input actions may be determined independently from the state transition table. For example, the appearance order of the input actions may be described by a logical expression such as a regular expression or a temporal logic. Such input restriction may be included in the format specification 102, and inputted to the apparatus.

In the same way as the cruise controller 51, the input restriction extraction unit 11 extracts the input restriction for the engine controller 52 and the brake controller 53. An example of the input restriction extracted from the behavioral specification of the engine controller 52 is shown as Table 2.

TABLE 2

Input restriction of the engine controller 52
INITIAL STATE = IdolMode

| PREVIOUS STATE | CONDITION | INPUT ACTION | NEXT STATE |
|---|---|---|---|
| IdolMode | — | EngineOn | NormalMode |
| NormalMode | — | EngineOff | IdolMode |
| NormalMode | — | activate | CruiseMode |
| NormalMode | — | accelOn | NormalMode |
| CruiseMode | — | deactivate | NormalMode |
| CruiseMode | — | EngineOff | IdolMode |
| CruiseMode | — | accelOn | CruiseMode |

As to the input restriction of Table 2, the output action is deleted from the state transition table of the engine controller 52 of FIG. 5, and the input restriction included in the format specification 102 is further added to the state transition table. The input restriction added is "deactivate is not accepted to the input action at Normal Mode state". In comparison with the behavioral specification (FIG. 5) of the engine controller 52 from which the output action is deleted, a line that input action "deactivate" is accepted at state "Normal Mode" is not included in the Table 2. This represents that "Normal Mode" is deleted from the pre-condition of the input action "deactivate", i.e., the input restriction is tightened.

<Test Case Generation Unit 12>

The test case generation unit 12 (an action sequence acquisition unit, a model generation unit) generates a plurality of input action sequences (individual test case) from the behavioral specification and the input restriction of the component, based on the model driven test technique.

As to the model driven test technique, a behavioral specification is regarded as a model, and a test case is generated from the model. For example, a method disclosed in the non-patent reference 2 is used as a test case generation technique. First, an operation of the test case generation technique is simply explained.

In the behavioral specification, by setting a state and a transition to a node and an edge respectively, a state transition table is represented as a graph (a state transition machine model). A test case generated comprises a plurality of action sequences. When a transition in the state transition machine model is executed based on the action sequence, the test case has characteristics that a transition coverage {(transition executed)/(all transitions in the state transition table)×100} is 100%. By calculating a transition path (Eular Path) of the input action from an initial state to execute all transitions, a test case including a plurality of action sequences is acquired.

In order to calculate the shortest transition path (Eular Path) on the graph, an algorithm of graph theory such as Chinese Postman Problem is used. As to the Eular Path, the graph is assumed to be a strong connection structure. Accordingly, if a graph (state transition machine model) corresponding to an original state transition table is not the strong connection structure, an edge to return to the initial state is suitably added to the graph to be the strong connection structure.

When the transition path (Eular Path) is calculated once, the Eular Path is divided at the edge added and a transition part to return to the initial state. As a result, a plurality of input action sequences having the transition coverage 100% (for a state transition system) can be acquired.

Figure 12:
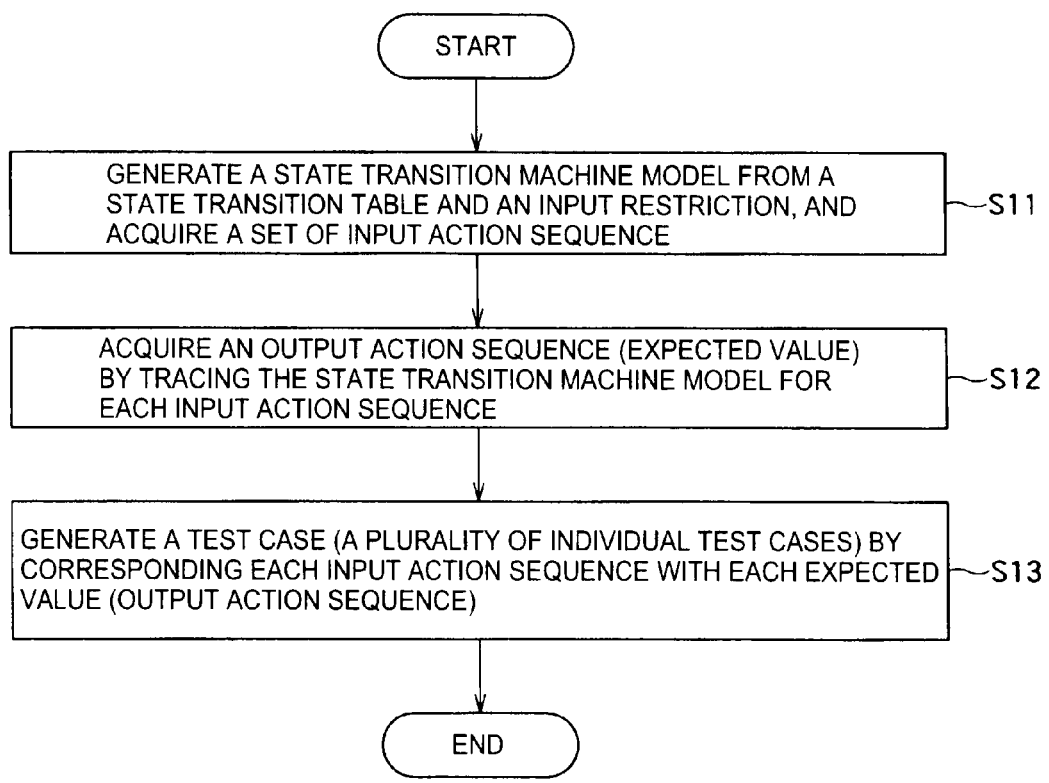
FIG. 12 is a flow chart of processing of a test case generation unit.

FIG. 12 is a flow chart of processing of the test case generation unit 12. First, at S11, a state transition machine model is generated from a state transition table (behavioral specification) and an input restriction. The state transition machine model represents a restricted behavioral specification that a restriction is added to the state transition table (behavioral specification) based on the input restriction. The test case generation unit 12 prepares a model generation unit to generate the state transition machine model. In addition to the test case generation unit 12, other units (a quality specification consistence verification unit 15, an input restriction calculation unit 16, a relaxed condition calculation unit 17, a tightened condition calculation unit 18, a quality specification calculation unit 20, a condition propagation unit 22) explained hereinafter may prepare the model generation unit.

Continually, at S11, based on the state transition machine model generated, a set of input action sequences as a transition sequence (Eular Path) staring from and returning to the initial state is generated.

Next, at S12, as for each of the input action sequences, an output action sequence is acquired by tracing the state transition machine model. The output action sequence is called "an expected value".

Next, at S13, by corresponding each input action sequence with the expected value (output action sequence) acquired from the input action sequence, a plurality of individual test cases are generated. A set of the plurality of individual test cases is equal to a test case.

Hereinafter, processing steps is explained in detail. At S11, a state transition machine model is generated from the state transition table and the input restriction. The state transition machine model is equal to a restricted behavioral specification of the present embodiment. As to the state transition machine model, a transition between net states is calculated based on the state transition table and a restriction of the input action (described in the input restriction), and a behavioral specification is generated as a graph having a state (node) and a transition (edge). The net state is a pair of the state and a local variable. If the input state is extracted from the state transition table only, the state transition model may be generated from the state transition table only.

In a state transition table of the cruise control unit 51 of FIG. 3, a combination <state, tgtSpeedSet> of the state and the local variable (tgtSpeedSet) is regarded as a net state, and a transition between the net states is calculated.

In the state transition machine model used in following explanation, conveniently, an output action is explicitly shown in Fig. As "state" in the state transition table, a special state for the output action is added, and the state and the transition relationship are extended.

For example, a transition relationship "a previous (source) state of transition→(input action/output action)→a destination state of transition" is extended to "a previous (source) state of transition→(input action)→a state for output action→(output action)→a destination state of transition". In this case, without the special state for output action, the state transition machine model may be regularly generated.

Based on above processing, the test case generation unit 12 generates a state transition machine model of the cruise controller 51, the engine controller 52 and the brake controller 53.

Figure 7:
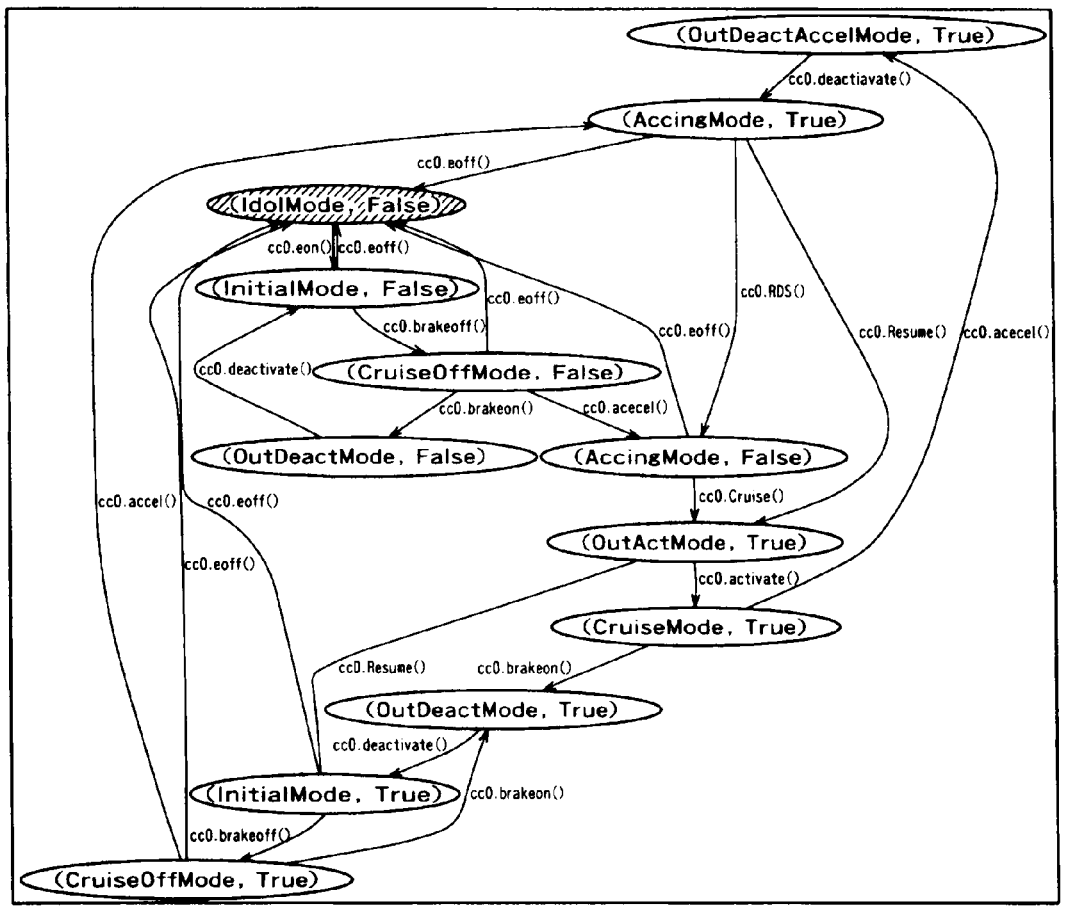
FIG. 7 is a schematic diagram of a state transition machine model of the cruise controller.
Figure 8:
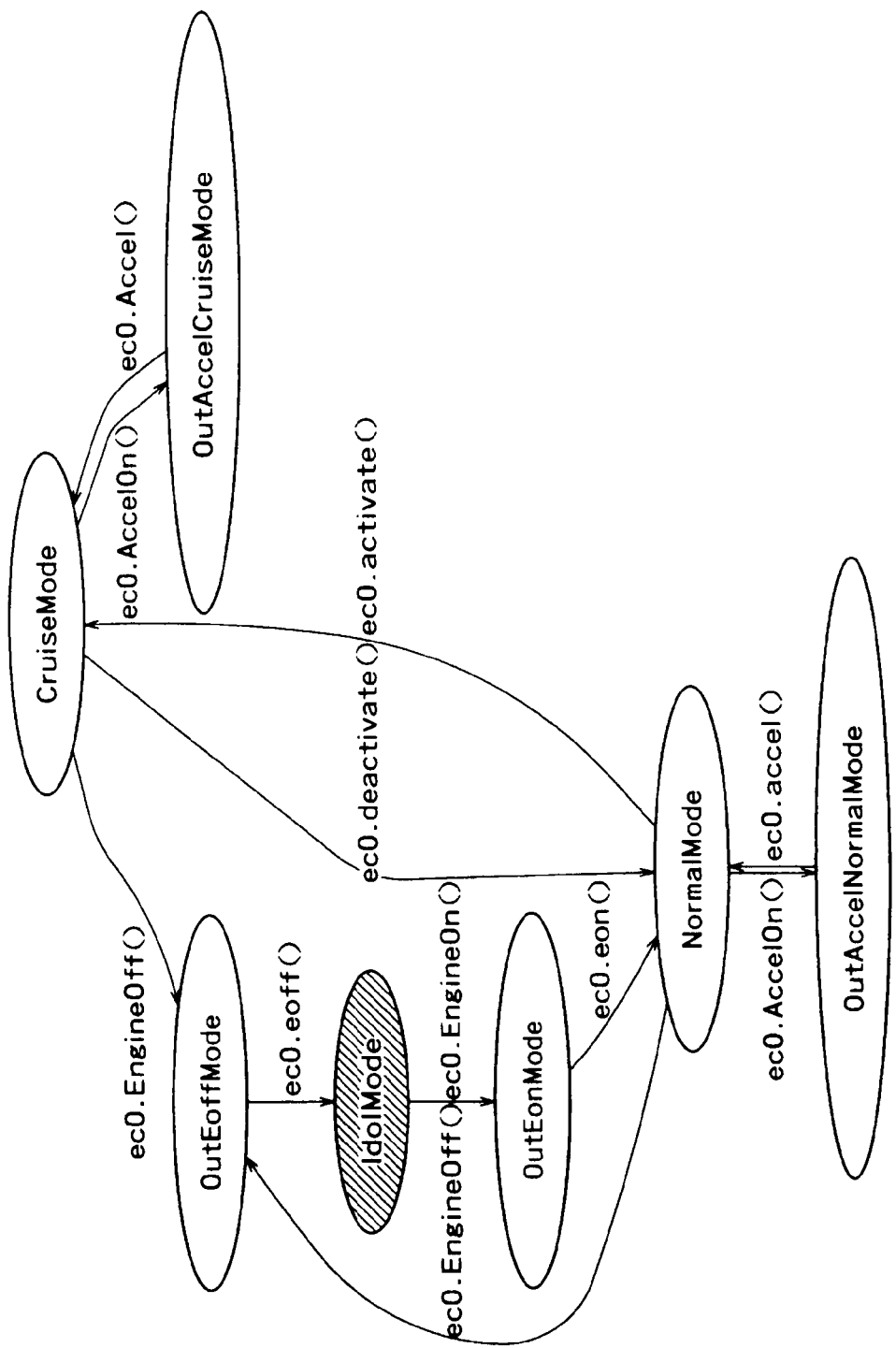
FIG. 8 is a schematic diagram of a state transition machine model of the engine controller.
Figure 9:
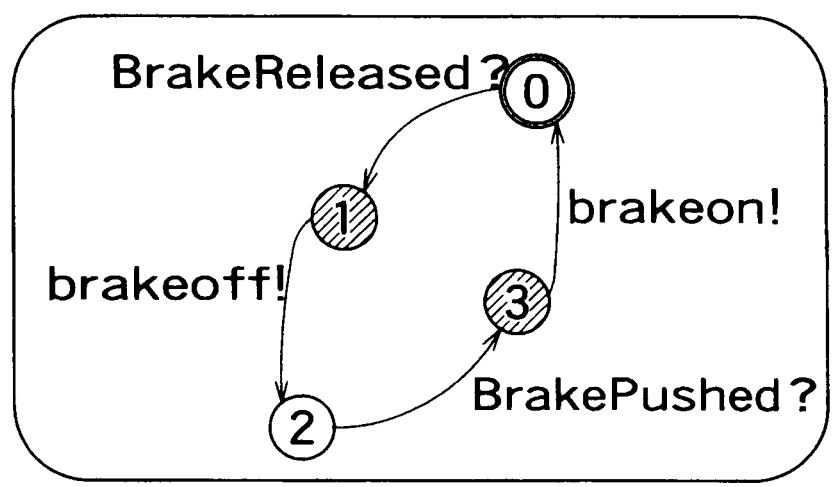
FIG. 9 is a schematic diagram of a state transition machine model of the brake controller.

FIG. 7 shows a state transition machine model (FSM1) of the cruise controller 51. In FIG. 7, three states "OutActMode, OutDeactMode, OutDeactAccelMode" are added as states for output action. FIG. 8 shows a state transition machine model (FSM2) of the engine controller 52. In FIG. 8, four states "OutEonMode, OutEoffMode, OutAccelCruiseMode, OutAccelNormalMode" are added as states for output action. FIG. 9 shows a state transition machine model (FSM3) of the brake controller 53.

Next, at S11, the test case generation unit 12 calculates a transition sequence (Eular Path) staring from and returning to the initial state, based on the state transition machine model. By calculating to satisfy all transitions included in the state transition machine model, as a result, a plurality of translation sequences (Eular Paths) starting from and returning to the initial state are acquired. In the present example, as mentioned-above, the state transition machine model includes special states for output action. Accordingly, the plurality of transition sequences includes an input action sequence and an output action sequence (expected value) respectively (each transition sequence is equal to an individual test case).

Briefly, in the present example, the output action is displayed as an explicit transition. By calculating a transition (Eular Path) staring from and returning to the initial state based on the state transition machine model, an action sequence (individual test case) in which the input action and the output action are mixed in order of transition is acquired. Accordingly, in the present example, processing of S12 and S13 is simultaneously executed at S11.

A following Table 3 shows test cases (a plurality of individual test cases) of the cruise controller 51, generated from the state transition machine model of FIG. 7. In the Table 3, "TESTSEGMENT(numeral)-CC" represents a discrimination name added to the individual test case, and six individual test cases "TESTSEGMENT0-CC~TESTSEGMENT5-CC" are shown. As to each individual test case, the input action and the output action are mixed in order of transition. The input action sequence is equal to the individual test case excluding the output action sequence. Conversely, the output action sequence is equal to the individual test case excluding the input action sequence. By dividing the individual test case (having the input action and the output action in order of transition) into an input action sequence and an output action sequence, correspondence between the input action sequence and the output action sequence may be managed as the individual test case.

In order to simplify the explanation, an input action sequence "TESTSEGMENT (numeral)-CC" represents an individual test case "TESTSEGMENT (numeral)-CC" excluding the output action sequence. All input action sequences "TESTSEGMENT0-CC~TESTSEGMENT5-CC" start at "eon( )" and end at "eoff( )". By testing the cruise controller 51 along these six input action sequences and confirming the output action, execution of test having the transition coverage 100% is guaranteed.

TABLE 3

Test case example of the cruise controller 51

TESTSEGMENT0-CC eon( )
brakeoff( )
brakeon( )
deactivate( )
eoff( )
TESTSEGMENT1-CC eon( )
brakeoff( )
accel( )
Cruise( )
activate( )
accel( )
deactivate( )
eoff( )
TESTSEGMENT2-CC eon( )
brakeoff( )
accel( )
Cruise( )
activate( )
brakeon( )
deactivate( )
brakeoff( )
brakeon( )
deactivate( )
Resume( )
activate( )
accel( )
deactivate( )
RDS( )
eoff( )
TESTSEGMENT3-CC eon( )
brakeoff( )
eoff( )
TESTSEGMENT4-CC eon( )
brakeoff( )
accel( )
Cruise( )
activate( )
brakeon( )
deactivate( )
eoff( )
TESTSEGMENT5-CC eon( )
brakeoff( )
accel( )
Cruise( )
activate( )
brakeon( )

TABLE 3-continued

Test case example of the cruise controller 51 deactivate( )
brakeoff( )
accel( )
Resume( )
activate( )
brakeon( )
deactivate( )
brakeoff( )
eoff( )

Table 4 shows an example of test cases (a plurality of individual test cases) generated from the state transition machine model (FIG. 8) of the engine controller 52.

TABLE 4

Test case example of the engine controller 52

TESTSEGMENT0-EC

EngineOn( )
eon( )
AccelOn( )
accel( )
activate( )
EngineOff( )
eoff( )
TESTSEGMENT1-EC EngineOn( )
eon( )
activate( )
AccelOn( )
accel( )
deactivate( )
EngineOff( )
eoff( )

<Quality Specification Generation Unit 13>

A quality specification generation unit 13 stores a quality specification of each component in a quality specification DB. The quality specification includes an input restriction, a behavioral specification and a test case mutually corresponded. Quality information can be stored in and referred from the quality specification DB 14 using a component name as a key. Furthermore, the quality specification generation unit 13 stores a system specification 101 inputted to the present apparatus. The quality specification generation unit 13 prepares a first storage unit to store the system specification, a second storage unit to store a behavioral specification, a third storage to store an input restriction, and a fourth storage unit to store a test case.

<Quality Specification Consistency Verification Unit 15>

A quality specification consistency verification unit 15 (a verification unit, a selection unit) acquires a quality specification between components mutually connected (connection relationship between components described in the system specification) from the quality specification DB 14, and verifies a consistency of the quality specification between components. The quality specification consistency verification unit 15 prepares the selection unit to select a pair of components mutually connected. As to verification for consistency between components, a first satisfiability verification of a first component as one of the pair to a second component as the other of the pair, and a second satisfiability verification of the second component to the first component, are included. As to the first satisfiability verification, whether a test case of the first component satisfies an input restriction of the second component is verified. As to the second satisfiability verification, whether a test case of the second component satisfies an input restriction of the first component is verified.

In the present example, the cruise controller 51 and the engine controller 52 are connected. Accordingly, satisfiability of a test case of the engine controller 52 to an input restriction of the cruise controller 51, and satisfiability of a test case of the cruise controller 51 to an input restriction of the engine controller 52 are respectively verified. In the same way, the cruise controller 51 and the brake controller 53 are connected. Accordingly, satisfiability of a test case of the brake controller 53 to an input restriction of the cruise controller 51, and satisfiability of a test case of the cruise controller 51 to an input restriction of the brake controller 53 are respectively verified.

Figure 13:
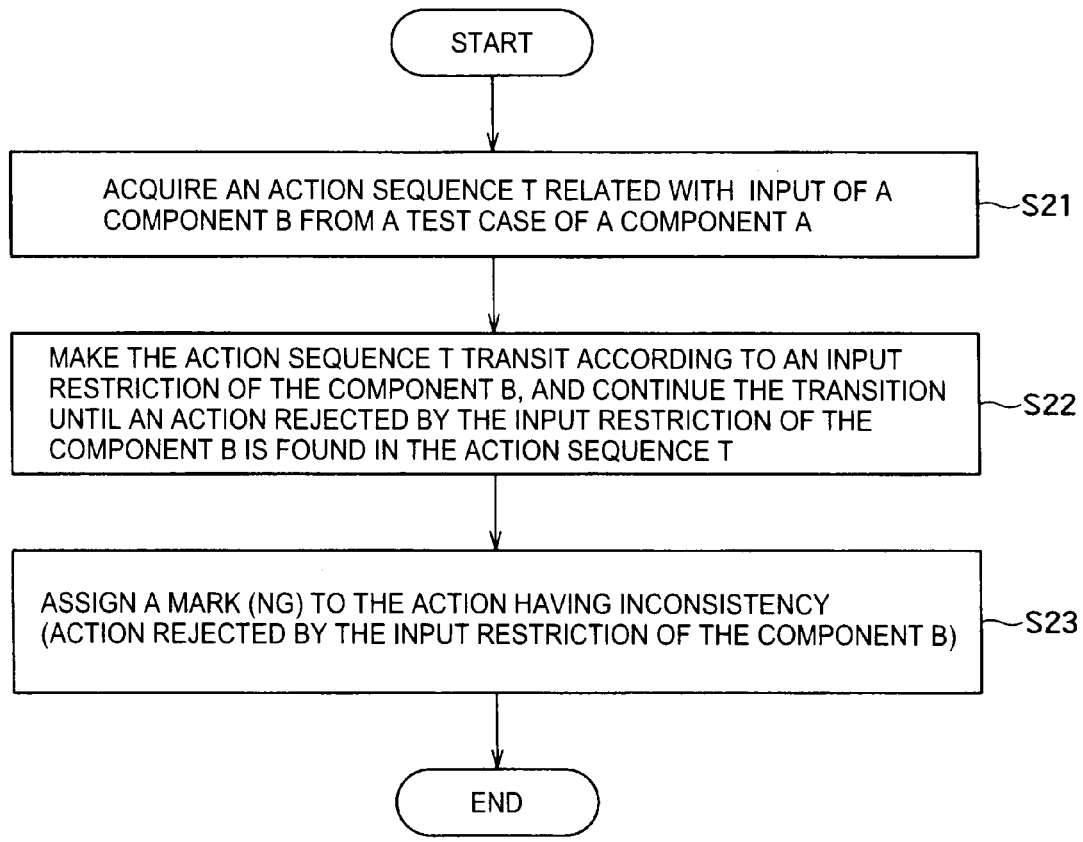
FIG. 13 is a flow chart of processing of a quality specification consistency verification unit.

FIG. 13 is a flow chart of processing of the quality specification consistency verification unit 15. In FIG. 13, a component A and a component B are connected, and satisfiability of the component A to the component B (whether a test case of the component A satisfies an input restriction of the component B) is verified. In the same way, satisfiability of the component B to the component A is verified.

At S21, an action sequence T related with an input (or input/output) of the component B is acquired from the test case of the component A. At S22, the action sequence T is transited according to an input restriction of the component B (or a state transition machine model acquired from the input restriction and a behavioral specification of the component B). In this case, an input action from any component except for the component A is ignored. This transition is continued until an action rejected by the input restriction (or the state transition machine model) of the component B is found in the action sequence T. At S23, a mark NG is assigned to the action rejected (having an inconsistency). Hereinafter, a concrete example is explained.

First, at S21, a test case (TESTSEGMENT0-EC, 1-EC) (Refer to Table 4) of the engine controller 52, and an input restriction (or input restriction/behavioral specification) (Refer to Table 1) of the cruise controller 52 connected to the engine controller 52, are read from the quality specification DB 14. An action sequence T related with an input (or input/output) of the cruise controller 51 is acquired from the test case of the engine controller 52. In the test case "TESTSEGMENT0-EC" of the engine controller 52, the action sequence T related with input of the cruise controller 51 is calculated as follows.

T="eon, accel, eoff"

Next, at S22, the action sequence T is transited according to the input restriction of the cruise controller 51 (Refer to FIG. 4), i.e., the transition is traced. In this case, if a transition by an input action unrelated with the cruise controller 51 (For example, input action from the brake controller 53 to the cruise controller 51) is found, this transition is supplemented (as if it exists) and forwarded. By tracing the transition along the action sequence T, a destination of transition is not found at a last action (=eoff), and a NG mark is assigned to the last action. A trace result of transition is shown as follows. In this result, "XXX" represents an action unrelated with the engine controller.

IdolMode→(eon)→InitialMode→(XXX)→CruiseOffMode→(accel)→AccingMode→(XXX)→CruiseMode→(eoff)NG At S21, by calculating an action sequence T related with input/output of the cruise controller 51, the action sequence T="eon, accel, activate, eoff" is acquired. Continually, at S22, by transiting the action sequence T along a state transition machine graph (acquired from the input restriction and the behavioral specification of the cruise controller 51), following trace result is acquired.

IdolMode→(eon)→InitialMode→(XXX)→CruiseOff-Mode→(accel)→AccingMode→(activate)→CruiseMode→(eoff)NG Next, NG mark in the action sequence T is corresponded with the test case "TESTSEGMENT0-EC", and following Table 5 is acquired. Briefly, inconsistency exists in this test case.

TABLE 5

| Inconsistency 1 TESTSEGMENT0-EC |
|---|
| EngineOn( ) |
| eon( ) |
| AccelOn( ) |
| accel( ) |
| activate( ) |
| EngineOff( ) |
| eoff( ) |
| NG ACTION |

In the present embodiment, verification of consistency is not limited to above-mentioned explanation. For example, if the input restriction is described by a logical expression such as a regular expression or a temporal logic, between the test case (trace sequence) of the component A and the input restriction of the component B, verification of consistency may be performed by verifying satisfiability of the input restriction (logical expression) of the trace sequence.

<Input Restriction Calculation Unit 16>

When the quality specification consistency verification unit 15 detects an inconsistency between two components mutually connected, an input restriction calculation unit 16 deletes the inconsistency by tightening an input restriction of one of the two components. In the test case generation technique, the number of test cases reduces by tightening the input restriction.

Figure 14:
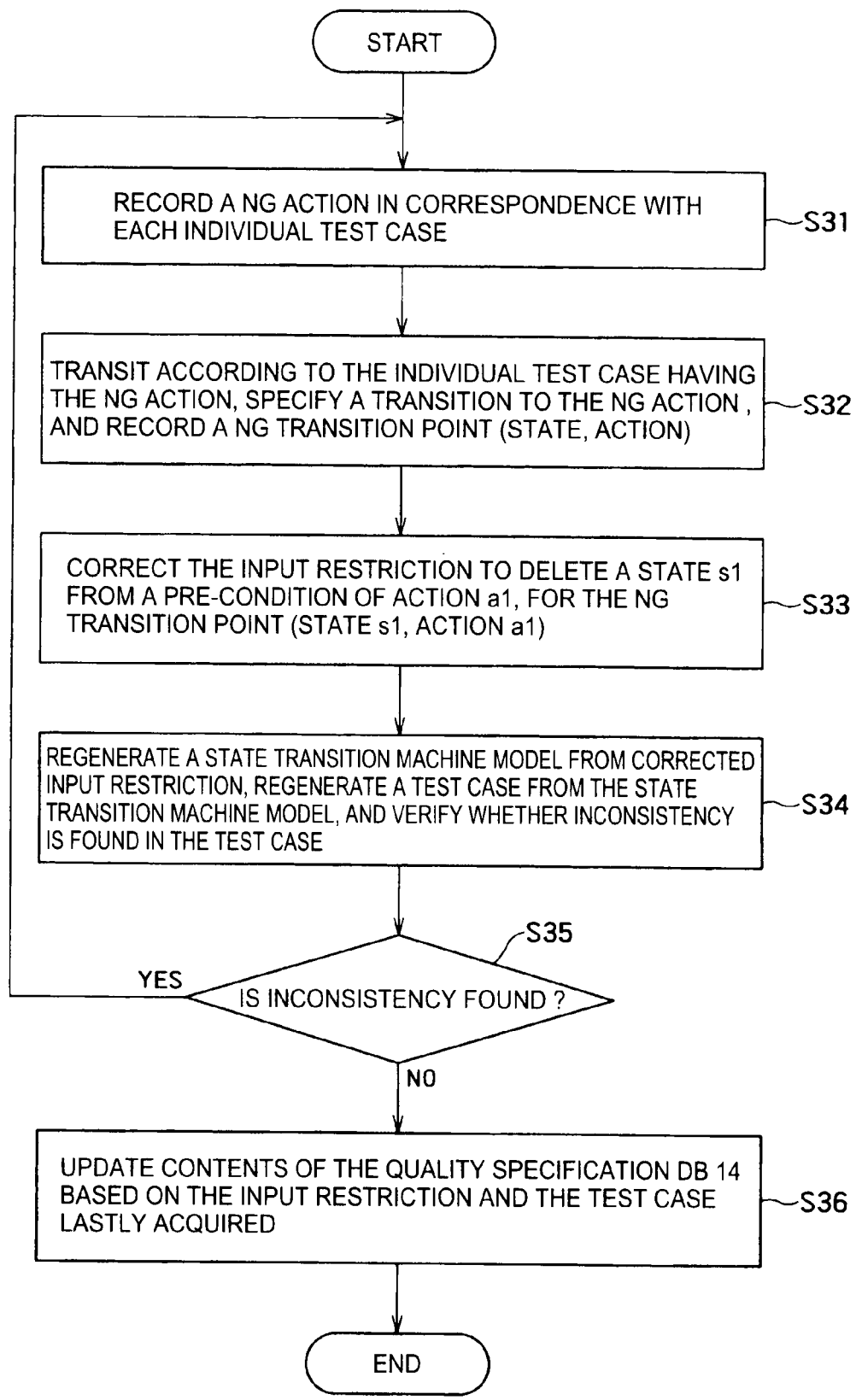
FIG. 14 is a flow chart of processing of an input restriction calculation unit.

FIG. 14 is a flow chart of processing of the input restriction calculation unit 16. At S31, as to each individual test case, NG actions having inconsistency state are recorded (Refer to Table 5).

At S32, according to an action sequence included in the individual test case having a NG action, transition is traced from an initial state of the state transition machine model (generated from the input restriction and the behavioral specification). A transition to the NG action is specified, and a NG transition point (a state, an action) corresponding to the transition in the state transition machine model is recorded. The action at the NG transition point is basically the NG action, and the state at the NG transition point is a previous state of the NG action. However, if the state transition machine model includes a state for output action and if the previous state of the NG action is the state for output action, by retroactively tracing the transition to the NG action, a state and an action for non-output action firstly found are specified, and a pair of the state and the action is set as a NG transition point.

At S33, as to all NG transition points (a state s1, an action a1) found, the input restriction is corrected to delete the state s1 from a pre-condition (previous state) of the action a1.

At S34, a state transition machine model is regenerated from the corrected input restriction and the behavioral specification. A test case is regenerated from the state transition machine model regenerated, and it is verified whether a new inconsistency is found in the test case. If the new inconsistency is found (Yes at S35), processing steps from S31 are repeated. Processing of S31~s32 is repeated until the inconsistency is not found (No at S35).

At S36, the input restriction and the test case lastly acquired are supplied to the quality specification update unit 19. The quality specification update unit 19 updates contents of the quality specification DB 14 by the supplied data.

Hereinafter, a concrete example is explained. In the present embodiment, inconsistency (inconsistency 1 in Table 5) of the individual test case (acquired from the engine controller 52) is deleted. Briefly, the input restriction of the engine controller 52 is corrected so that the individual test case having inconsistency is not generated for input to the cruise controller 51.

First, at S31, in order to delete inconsistency 1 in Table 5, a NG action in Table 5 is recorded. Next, at S32, by tracing the state transition machine model (Refer to FIG. 8) of the engine controller 52, the individual test case (TESTSEGMENT0-EC) of Table 5 is transited in order. In this case, as shown in FIG. 10, a transition to a NG action is found.

Figure 10:
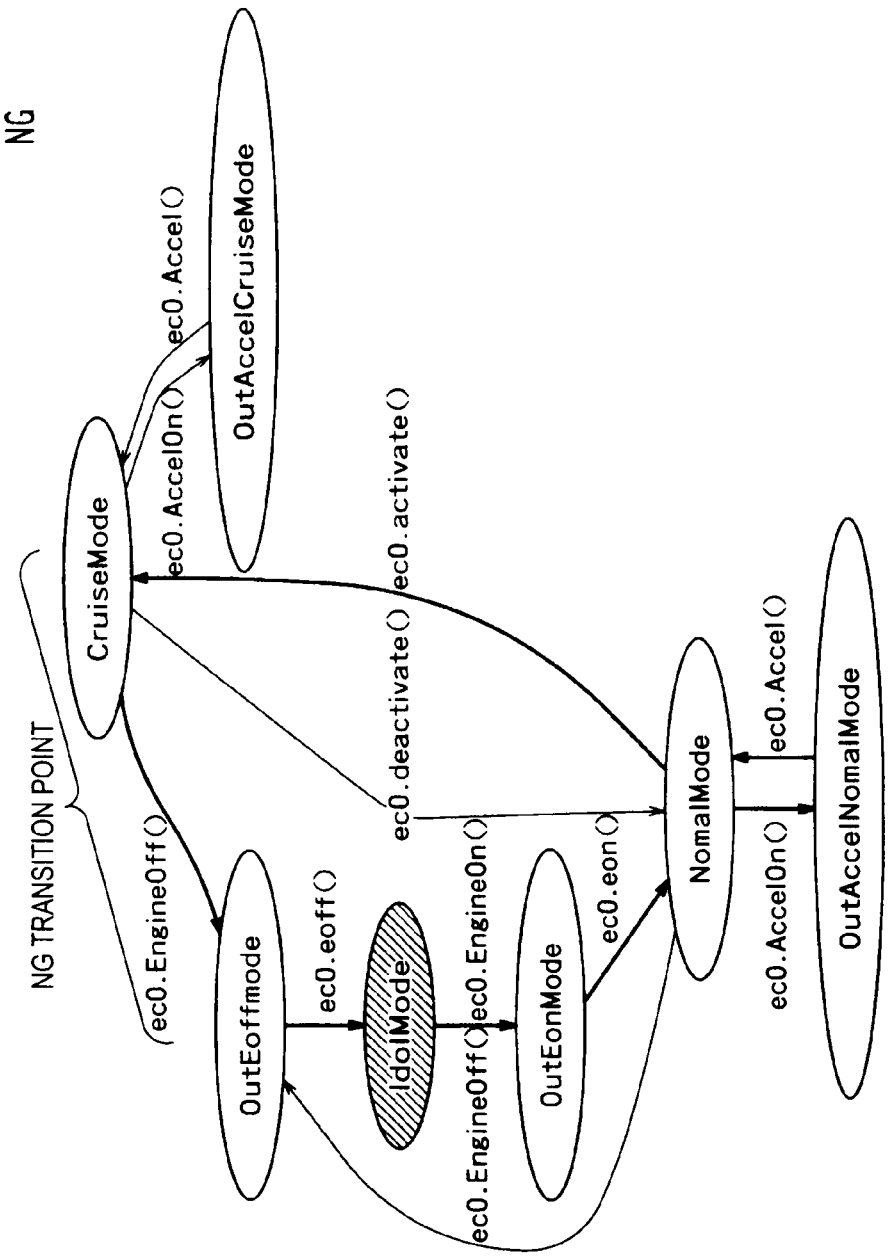
FIG. 10 is a schematic diagram of a state transition machine model of the engine controller having a NG transition point.

In FIG. 10, a part to generate an output action "eoff( )" at a state "OutEoffMode" is acquired as the NG point. However, the state "OutEoffMode" is a state for output action. Accordingly, this transition is retroactively traced to reach a state for non-output action. As a result, a cause of inconsistency is decided as "EngineOff action is inputted from the outside at a state CruiseMode". This NG transition point is recorded as "(state, action)=(CruiseMode, EngineOff)".

Next, at S33, a state included in the NG transition point is deleted from a pre-condition (previous state) of an action included in the NG transition point. The input restriction (Refer to Table 2) of the engine controller 52 includes two pre-conditions {NormalMode, CruiseMode} of EnginOff. By deleting the pre-condition "CruiseMode" of the NG transition point from two pre-conditions {NormalMode, CruiseMode}, the input restriction is corrected. This deletion of the pre-condition represents deletion of one line "CruiseMode, EngineOff, IdolMode" from the input restriction of Table 2.

At S34, a state transition machine model of the engine controller 52 is regenerated based on the corrected input restriction and the behavioral specification. A test case is generated from the state transition machine model regenerated. As a result, the test case (one individual test case) shown in Table 6 is acquired.

TABLE 6

| Corrected test case (Engine controller 52) TESTSEGMENT0-CC |
|---|
| EngineOn( ) |
| eon( ) |
| AccelOn( ) |
| accel( ) |
| activate( ) |
| AccelOn( ) |
| accel( ) |
| deactivate( ) |
| EngineOff( ) |
| eoff( ) |

By verifying satisfiability for the input restriction of the cruise controller 51 (S35), a NG action is not found. Accordingly, the inconsistency 1 is already deleted (No at S35). At S36, the corrected input restriction and the corrected test case (Table 6) are supplied to the quality specification update unit 19. The quality specification update unit 19 updates contents of the quality specification DB 14 by the supplied data.

<Relaxed Condition Calculation Unit 17>

When the quality specification consistency verification unit 15 detects an inconsistency between two components mutually connected, a relaxed calculation unit 17 deletes the inconsistency by relaxing an input restriction of one of the two components to satisfy a test case of the other of the two components. In the test case generation technique, the number of test cases increases by relaxing the input restriction.

Figure 15:
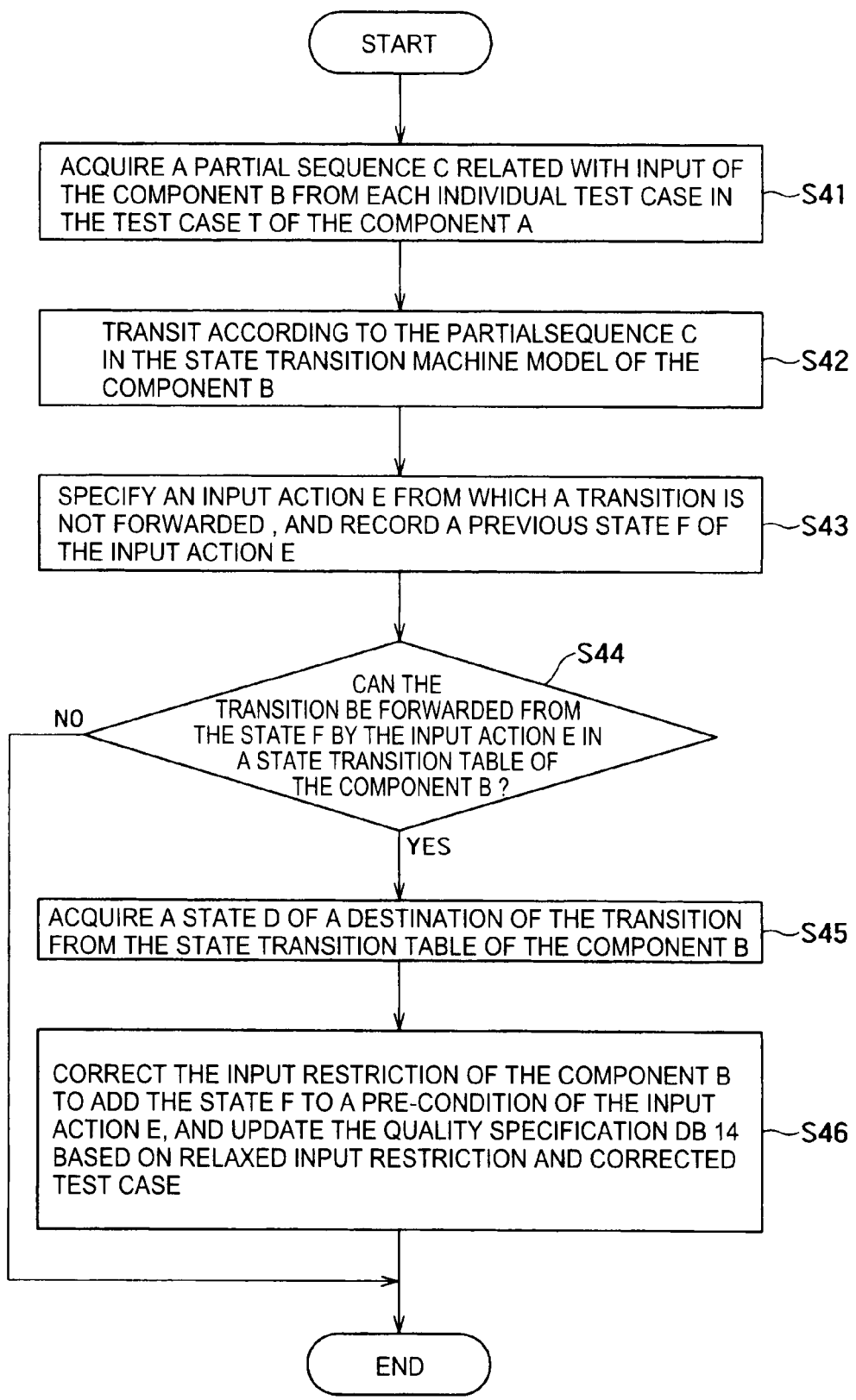
FIG. 15 is a flow chart of processing of a relaxed condition calculation unit.

FIG. 15 is a flow chart of processing of the relaxed condition calculation unit 17. In FIG. 15, when the quality specification consistency verification unit 15 detects inconsistency between components A and B (a test case of the component A does not satisfy an input restriction of the component B), processing of the relaxed condition calculation unit 17 is shown.

At S41, from each individual test case in the test case T of the component A, a partial sequence C related with input (or input/output) of the component B is acquired respectively.

At S42, in a state transition machine model acquired from the input restriction (or input restriction/behavioral specification) of the component B, a transition is executed from the initial state according to the partial sequence C.

At S43, the transition of the partial sequence C is continued until the transition reaches an input action E from which the transition is not forwarded, and an original state (a previous state) F of the input action E is recorded. Alternatively, a destination state (a next state) F of a previous action of the input action E is recorded.

At S44, by referring to the state transition table of the component B, it is verified whether a transition is forwarded from the state F by the input action E. If the transition is not forwarded (No), a purport that the condition cannot be relaxed is displayed, and the processing is completed. If the transition is forwarded (Yes), a state D of a destination of the transition is acquired from the state transition table of the component B (S45).

At S46, the input restriction of the component B is corrected to add the state F to the pre-condition (previous state) of the input action E. In this case, a destination of transition from the state F is set as the state D. After that, a test case is acquired from a relaxed input restriction and a state transition machine model reflecting the relaxed input restriction, and supplied to quality specification update unit 19. The quality specification update unit 19 updates the quality specification DB 14 by supplied data.

Hereinafter, a concrete example is explained. In a test case (Table 3) of the cruise controller 51, an individual test case "TESTSEGMENT0-CC" is used as an exercise. This individual test case "TESTSEGMENT0-CC" is shown as Table 7.

TABLE 7

| Test case T (Cruise controller) TESTSEGMENT0-CC |
|---|
| eon( ) |
| brakeoff( ) |
| brakeon( ) |
| deactivate( ) |
| eoff( ) |

First, the quality specification consistency verification unit 15 verifies a consistency between the individual test case of Table 7 and a state transition machine model (generated from the input restriction of Table 2 and the behavioral specification) of the engine controller 52. In the state transition table of the engine controller 52, the transition does not exist at a part to call an input action "deactivate( )", and this input action is detected as a NG action. Briefly, as shown in Table 8, the quality specification consistency verification unit 15 acquires inconsistency 2.

TABLE 8

| Inconsistency 2 TESTSEGMENT0-CC |
|---|
| eon( ) |
| brakeoff( ) |
| brakeon( ) |
| deactivate( ) NG ACTION |
| eoff( ) |

At S41, from this individual test case, partial sequences "eon( ), deactivate( ), eoff( )" related with input/output of the engine controller 52 are acquired.

At S42 and S43, in a state transition machine model (generated from the state transition table (FIG. 5) and the input restriction (Table 2)) of the engine controller 52 shown in FIG. 8, actions of the partial sequence "eon( ), deactivate( ), eoff( )" are tranced in order. In this case, a transition is not forwarded from a state "NormalMode" by an action "deactivate". Accordingly, a previous state "NormalMode" is recorded. The action "deactivate" is equal to above-mentioned action E.

At S44, in the state transition table (FIG. 5) of the engine controller 52, it is verified whether a transition is forwarded from the state "NormalMode" by the action "deactivate". In this case, the transition is forwarded. Accordingly, "NormalMode" is acquired as a state of a destination of the transition (S45). This state "NormalMode" is equal to above-mentioned state D.

At S46, as to a state "CruiseMode" as a pre-condition of the action "deactivate( )", the input restriction (Table 2) is corrected to add "NormalMode". Briefly, following new transition is added to the input restriction (Table 2). As a destination of the transition, the state D "NormalMode" acquired at S45 is added. Transition added=[NormalMode, -, deactive, -, NormalMode]

The input restriction corrected (relaxed) by above-processing is shown in Table 9. New transition is added at the fourth line from the bottom in Table 9.

TABLE 9

| Corrected (relaxed) input restriction (engine controller 52) INITIAL STATE = IdolMode | | | |
|---|---|---|---|
| PREVIOUS STATE | CONDITION | INPUT ACTION | NEXT STATE |
| IdolMode | — | EngineOn | NormalMode |
| NormalMode | — | EngineOff | IdolMode |
| NormalMode | — | activate | CruiseMode |
| NormalMode | — | accelOn | NormalMode |
| NormalMode | — | deactivate | NormalMode |
| CruiseMode | — | deactivate | NormalMode |
| CruiseMode | — | EngineOff | IdolMode |
| CruiseMode | — | accelOn | CruiseMode |

In the quality specification consistency verification unit 15, a test case (Table 7) of the cruise controller 51 is consistent with an input action (Table 9) of the engine controller 52. Briefly, at a previous state "NormalMode" of the input action "deactivate" (in the test case) of the engine controller 52, by supplementing an input action unrelated with the engine controller 52, the transition can reach from the initial state to "NormalMode". As a result, "inconsistency 2" is deleted.

<Tightened Condition Calculation Unit 18>

As to two components (mutually connected) not having inconsistency, a tightened condition calculation unit 18 tightens an input restriction of one of the two components in a range that a test case of the other of the two components is satisfied. Briefly, the input restriction of one component is tightly corrected to suppress transition included in a behavioral specification of the one component. At a point to tighten the input restriction, processing of the tightened condition calculation unit 18 is same as the input restriction calculation unit 16. However, as a situation to process, the latter processes at the case that inconsistency is detected, but the former processes at another case.

Figure 16:
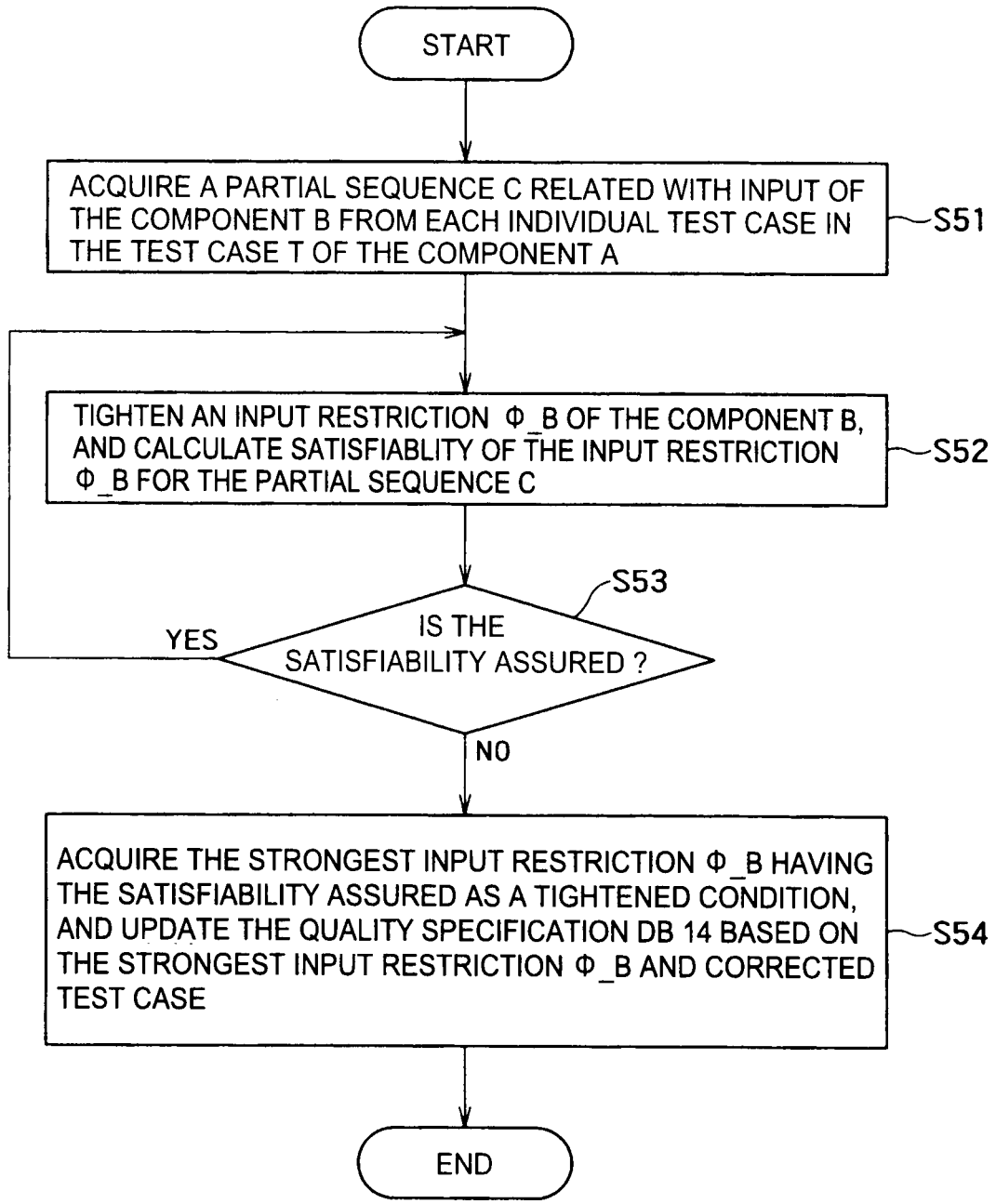
FIG. 16 is a flow chart of processing of a tightened condition calculation unit.

FIG. 16 is a flow chart of processing of the tightened condition calculation unit 18. Assume that a test case (behavioral trace) of the component A satisfies an input restriction of the component B (connected to the component A), i.e., the quality specification consistency verification unit 15 does not detect inconsistency. In this case, processing of the tightened condition calculation unit 18 is explained.

At S51, a partial sequence C related with input of the component B is acquired from each individual test case in the test case T of the component A.

At S52, the input restriction $\phi\_B$ is tightened, and satisfiability of the input restriction $\phi\_B$ for the partial sequence C is calculated. One example of detail steps of S52 is shown as [S52-1]~[S52-4]. In this case, a state transition machine model generated from a behavioral specification of the component B is used as automaton to decide acception/rejection of input action.

[S52-1] A state transition machine model M_B is generated from the input restriction $\phi\_B$ of the component B.

[S52-2] Each individual test case in the test case T of the component A is accepted by the state transition machine model M_B.

[S52-3] A new state transition machine model M_B' is acquired by deleting a transition and a state not executed in the state transition machine model M_B.

[S52-4] By reflecting the new state transition machine model M_B' on the input restriction B, unnecessary precondition is deleted from the input restriction $\phi\_B$. Briefly, the input restriction $\phi\_B$ is tightened.

At S53, while satisfiability is assured (YES), tightening of the input restriction $\phi\_B$ at S52 is repeated. When satisfiability is not assured (NO), processing is forwarded to S54.

S54, the strongest (most tightened) input restriction $\phi\_B$ assuring satisfiability is acquired as a tightened condition. After that, a state transition machine model is acquired from the strongest input restriction $\phi\_B$ and the behavioral specification. A test case generated from the state transition machine model, and the strongest input restriction $\phi\_B$, are supplied to the quality specification update unit 19. The quality specification update unit 19 updates the quality specification DB 14 based on the supplied data.

Hereinafter, a concrete example of processing of the tightened condition calculation unit 18 is explained. As the assumption, an input restriction of the cruise controller 51 is the input restriction of Table 1 from which one line "CruiseOffMode, -, brakeon, InitialMode" is deleted. Furthermore, an input restriction of the engine controller 52 is the corrected input restriction (Table 9) explained at <Relaxed condition calculation unit 17>.

At S51, a test case of the cruise controller 51 is calculated using the input restriction from which one line "CruiseOffMode, -, brakeon, InitialMode" is deleted and a behavioral specification. From the test case, six individual test cases (action sequence)"TESTSEGMENT0-CC~TESTSEGMENT5-CC". By extracting output actions related with input of the engine controller 52 from each action sequence "TESTSEGMENT0-CC~TESTSEGMENT5-CC", following partial sequences "TESTSEGMENT1-CC, TESTSEGMENT3-CC, TESTSEGMENT4-CC, TESTSEGMENT5-CC" are acquired. As to action sequences "TESTSEGMENT0-CC, TESTSEGMENT2-CC", its description is omitted because an output action related with input of the engine controller 52 is not included.

TABLE 10

Output action of the cruise controller 51 (limited to input action to the engine controller 52)

TESTSEGMENT1-CC activate( )
deactivate( )
TESTSEGMENT3-CC activate( )
deactivate( )
TESTSEGMENT4-CC activate( )
deactivate( )
TESTSEGMENT5-CC activate( )
deactivate( )
activate( )
deactivate( )
activate( )
deactivate( )

At S52, in a state transition machine model (of the engine controller 52) based on the input restriction of Table 9 and the behavioral specification, each partial sequence of Table 10 is transited. Concretely, the input restriction limited to an output action from the cruise controller 51 (an input action to the engine controller 52) is extracted as shown in Table 11. According to the input restriction of Table 11, each partial sequence of Table 10 is transited.

TABLE 11

Input restriction to the engine controller 52
(limited to output from the cruise controller 51)
INITIAL STATE = 0

| PREVIOUS STATE | CONDITION | INPUT ACTION | NEXT STATE |
|---|---|---|---|
| 0 | — | activate | 1 |
| 0 | — | deactivate | 0 |
| 1 | — | deactivate | 0 |

By transiting each partial sequence of Table 10 based on the input restriction of Table 11, a transition to call "deactivate" from a previous state "0" is unnecessary (not executed). Accordingly, this transition is deleted from the input restriction of Table 9. This transition is following line.

"NormalMode, -, deactivate, NormalMode"

In this way, the condition is tightened by deleting unnecessary input restriction.

<Quality Specification Update Unit 19>

As explained before, a quality specification update unit 19 updates contents of the quality specification DB 14, based on an input restriction corrected by the input restriction calculation unit 16, the relaxed condition calculation unit 17 and the tightened condition calculation unit 18, and a test case generated from a state transition machine model based on the corrected input restriction and a behavioral specification.

<Quality Specification Calculation Unit 20 for High Level Hierarchy>

A quality specification calculation unit 20 for high level hierarchy calculates a quality specification of a high level hierarchical component (Hereinafter, it is called "high level hierarchy") comprising low level components, based on a quality specification of the low level components. For example, in the cruise control system of FIG. 2, by combining three components (low level component) of the cruise controller 51, the engine controller 52 and the brake controller 53, the cruise control system (high level hierarchy) is composed. The quality specification calculation unit 20 calculates a quality specification of the cruise control system from quality specifications of the three components.

Figure 17:
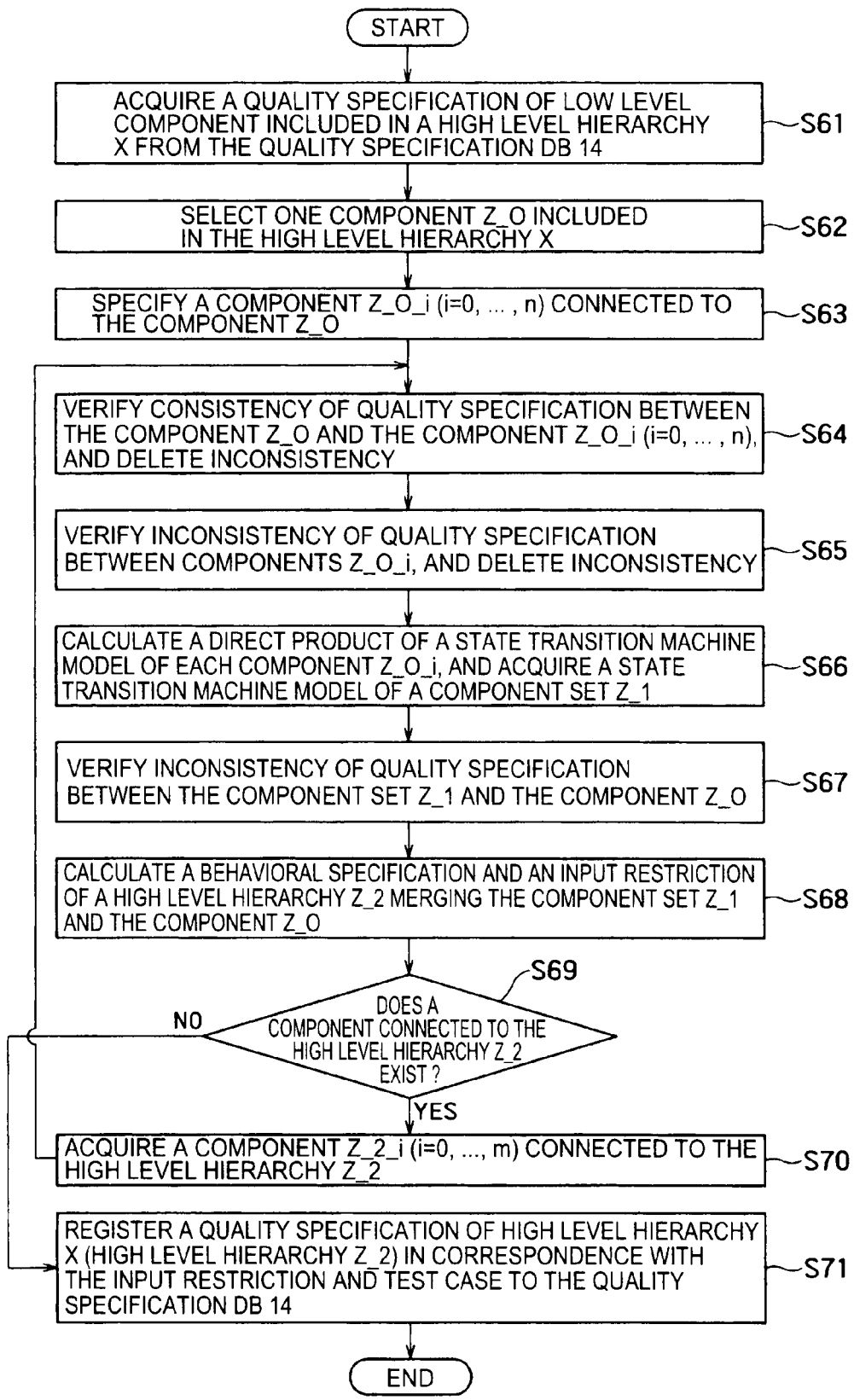
FIG. 17 is a flow chart of processing of a quality specification calculation unit for high level hierarchy.

FIG. 17 is a flow chart of processing of the quality specification calculation unit 20 for high level hierarchy. At S61, a quality specification of a low level component included in a high level hierarchy X from the quality specification DB 14. At S62, one component $Z\_0$ included in the high level hierarchy X is selected. At S63, components $Z\_0\_i$ (i=0, . . . n) connected to the component $Z\_0$ is specified.

At S64, a consistency of quality specification between the component $Z\_0$ and the component $Z\_0\_i$ (i=0, . . . n) is calculated. If an inconsistency is detected, the inconsistency is deleted by calculating an input restriction or a relaxed condition. The quality specification calculation unit 20 prepares a selection unit to select a group of components mutually connected, a pair of components mutually connected, or both the group and the pair.

At S65, it is verified whether a connection between two components in each component $Z\_0\_i$ exists. If the connection exists, in the same way as S64, a consistency between the two components is verified, and an inconsistency is deleted.

At S66, as to each component $Z\_0\_i$, a direct product of a state transition machine model (generated from the input restriction and the behavioral specification) is calculated in order (i=0~n). As a result, a behavioral specification (state transition machine model) of a component set $Z\_1$ merging each component $Z\_0\_i$ (i=0, . . . n) is acquired. This calculation equation is represented as follows. In the equation, (X) is a sign of direct product, and $R\_0\_i$ (i=0, . . . n) is a mediate variable to conveniently calculate.

$R\_0\_0 = Z\_0\_0$
$R\_0\_i = R\_0\_\{i-1\}$ (X) $Z\_0\_i$ (i=1, . . . n)
$Z\_1 = R\_0\_n$

At S67, a consistency between the component set $Z\_1$ and the component $Z\_0$ is verified. If an inconsistency is detected, the inconsistency is deleted. While the consistency is verified, an input restriction of the component set $Z\_1$ is extracted from the behavioral specification (state transition machine model) acquired at S66. At S68, a behavioral specification of a high level hierarchy $Z\_2$ merging the component set $Z\_1$ and the component $Z\_0$ is calculated, and an input restriction is extracted from the behavioral specification.

At S69, it is verified whether a component connected to the high level hierarchy $Z\_2$ exists. If the component does not exist (NO), i.e., if processing of all components is completed, a behavioral specification of the high level hierarchy $Z\_2$ is set as a behavioral specification of a high level hierarchy X, and an input restriction of the high level hierarchy $Z\_2$ is set as an input restriction of the high level hierarchy X (S71). After that, the behavioral specification and the input restriction of the high level hierarchy X are corresponded with a test case acquired from a state transition machine model (based on the behavioral specification and the input restriction), and registered as a quality specification for high level hierarchy to the quality specification DB 14 (S71). If the component connected to the high level hierarchy $Z\_2$ exists (YES), each component $Z\_2\_i$ (i=0, . . . n) connected to the high level hierarchy $Z\_2$ is acquired (S70), and each step from S64 is repeated.

Hereinafter, a concrete example of processing of the quality specification calculation unit 20 is explained. In the present embodiment, as shown in FIG. 2, by connecting the cruise controller 51 to the engine controller 52 and the brake controller 53 respectively, the cruise control system as a high level hierarchy is composed.

At S61, the cruise control system is selected as a high level hierarchy X, and each component (low level component) included in the high level hierarchy X is acquired from the quality specification DB 14. At S62, as a component Z0 included in the high level hierarchy X, the cruise controller 51 is selected. At S63, as a component connected to the cruise controller 51, the engine controller 52 and the brake controller 53 are acquired. Briefly, two components $Z\_0\_i$ (i=0,2) are acquired. A component $Z\_0\_0$ is the engine controller 52, and a component $Z\_0\_1$ is the brake controller 53.

At S64, the quality specification consistency verification unit 15 verifies a consistency between the brake controller 53 (component $Z\_0\_1$) and the cruise controller 51 (component Z0), and a consistency between the engine controller 52 (component $Z\_0\_0$) and the cruise controller 51 (component Z0). If an inconsistency is detected, the inconsistency is deleted by the input restriction calculation unit 16 and the relaxed condition calculation unit 17. This processing is omitted because it is already explained.

At S65, it is verified whether the engine controller 52 (component $Z\_0\_0$) and the brake controller 53 (component $Z\_0\_1$) are connected. In this case, they are not connected, i.e., each component independently operates. Accordingly, processing is forwarded to S66.

At S66, a direct product between a state transition machine model FSM2 of the engine controller 52 (component $Z\_0\_0$) and a state transition machine model FSM3 of the brake controller 53 (component $Z\_0\_1$) is calculated. As a result, a state transition machine model FSM4 of a component set $Z\_1$ merging the engine controller 52 (component $Z\_0\_0$) and the brake controller 53 (component $Z\_0\_1$) is acquired.

FIG. 11 is a state transition table (the engine controller×the brake controller) representing a behavior of the state transition machine model FSM4. A state of the state transition machine model FSM4 is represented as combination of a state of the engine controller 52 and a state of the brake controller 53. In order to simplify the notation, a name of the situation is omitted. The state of the engine controller 52 is abbreviated according to (I: IdolMode, N: NormalMode, C: CruiseMode). The state of the brake controller 53 is abbreviated according to (ON: BrakeOnMode, OFF: BrakeOffMode).

Following Table 12 shows an input restriction extracted from the state transition table of FIG. 11.

TABLE 12

Input restriction of FSM4
INITIAL STATE = (IdolMode, BrakeOnMode) = (I, ON)

| PREVIOUS STATE | CONDITION | INPUT ACTION | NEXT STATE |
|---|---|---|---|
| (I, ON) | — | EngineOn | (N, ON) |
| (I, ON) | — | BrakeReleased | (I, OFF) |
| (N, ON) | — | BrakeReleased | (N, OFF) |
| (N, ON) | — | EngineOff | (I, ON) |
| (N, ON) | — | activate | (C, ON) |
| (N, ON) | — | AccelOn | (N, ON) |
| (I, OFF) | — | EngineOn | (N, OFF) |
| (I, OFF) | — | BrakePushd | (I, ON) |
| (N, OFF) | — | BrakePushd | (N, ON) |
| (N, OFF) | — | EngineOff | (I, OFF) |
| (N, OFF) | — | activate | (C, OFF) |
| (N, OFF) | — | AccelOn | (N, OFF) |

TABLE 12-continued

Input restriction of FSM4
INITIAL STATE = (IdolMode, BrakeOnMode) = (I, ON)

| PREVIOUS STATE | CONDITION | INPUT ACTION | NEXT STATE |
|---|---|---|---|
| (C, OFF) | — | BrakePushd | (C, ON) |
| (C, OFF) | — | deactivate | (N, OFF) |
| (C, OFF) | — | AccelOn | (C, OFF) |
| (C, ON) | — | BrakeReleased | (C, OFF) |
| (C, ON) | — | deactivate | (N, ON) |
| (C, ON) | — | AccelOn | (C, ON) |

At S67, a consistency between the component set Z_1 (the engine controller 52, the brake controller 53) and the component Z_0 (the cruise controller 51) is verified. Following Table 13 shows a test case generated from the state transition machine model FSM4 by the test case generation unit 12. This test case includes a plurality of individual test cases. Each individual test case is composed of an input action and an output action (expected value).

TABLE 13

Test case (including expected values, the engine controller × the brake controller)

TESTSEGMENT0-B E ebc0.EngineOn( )
ebc0.eon( )
ebc0.activate( )
ebc0.BrakeReleased( )
ebc0.brakeoff( )
ebc0.AccelOn( )
ebc0.accel( )
ebc0.deactivate( )
ebc0.AccelOn( )
ebc0.accel( )
ebc0.activate( )
ebc0.BrakePushed( )
ebc0.brakeon( )
ebc0.AccelOn( )
ebc0.accel( )
ebc0.deactivate( )
ebc0.AccelOn( )
ebc0.accel( )
ebc0.BrakeReleased( )
ebc0.brakeoff( )
ebc0.EngineOff( )
ebc0.eoff( )
ebc0.BrakePushed( )
ebc0.brakeon( )

TESTSEGMENT1-B E ebc0.BrakeReleased( )
ebc0.brakeoff( )
ebc0.EngineOn( )
ebc0.eon( )
ebc0.BrakePushed( )
ebc0.brakeon( )
ebc0.EngineOff( )
ebc0.eoff( )

Each individual test case included in the test case of Table 13 is compared with the input restriction (Table 1) of the cruise controller 51. As a result, in "TESTSEGMENT0-BE" of Table 13, following NG action is specified. Briefly, the third action "activate( )" is specified as the NG action.

TESTSEGMENT0-BE ebc0.EngineOn( )
ebc0.eon( )

TESTSEGMENT0-BE ebc0.activate( ) NG action
ebc0.BrakeReleased( )
ebc0.brakeoff( )
ebc0.AccelOn( )
. . . . (The rest is omitted)

Briefly, the inconsistency to be deleted is detected. In this case, the inconsistency is deleted by the input restriction calculation unit 16. A previous state of the NG action is "(N,ON)". Accordingly, the input restriction of FSM4 of Table 12 is corrected to delete "(N,ON)" from the pre-condition (previous state) of "activate" action.

A state transition machine model FSM4 is regenerated from the corrected input restriction and the behavioral specification. The test case generation unit 12 regenerates a test case from FSM4. This test case is represented as follows.

TESTSEGMENT0-EB ebc0.EngineOn( )
ebc0.eon( )
ebc0.AccelOn( ) NG action
ebc0.accel( )
ebc0.BrakeReleased( )
ebc0.brakeoff( )
ebc0.activate( )
ebc0.BrakePushed( )
ebc0.brakeon( )
ebc0.AccelOn( )
ebc0.accel( )
ebc0.BrakeReleased( )
ebc0.brakeoff( )
ebc0.deactivate( )
ebc0.AccelOn( )
ebc0.accel( )
ebc0.activate( )
ebc0.AccelOn( )
. . . . (The rest is omitted)

The fourth action "accel" is first specified as a NG action. However, this action "accel" is an output action. Accordingly, by retroactively tracing the test case, a previous action "AccelOn" is actually a NG action. In this case, a previous state is "(N,ON)". The input restriction is corrected again to delete "(N,ON)" from the pre-condition (previous state) of the action "AccelOn".

In this way, correction of the input restriction, generation of the test case, and verification of satisfiability for the input restriction of the cruise controller 51, are repeated until the consistency is maintained. In the same way, verification of satisfiability of the test case of the component Z_0 (the cruise controller 51) for the input restriction of the component set Z_1 (the engine controller 52, the brake controller 53) is repeated until the consistency is maintained. As a result, the input restriction shown in Table 14 is acquired.

TABLE 14

INITIAL STATE = (IdolMode, BrakeOnMode)

| PREVIOUS STATE | CONDITION | INPUT ACTION | NEXT STATE |
|---|---|---|---|
| (I, ON) | — | EngineOn | (N, ON) |
| (I, ON) | — | BrakeReleased | (I, OFF) |
| (N, ON) | — | BrakeReleased | (N, OFF) |
| (N, ON) | — | EngineOff | (I, ON) |

TABLE 14-continued

INITIAL STATE = (IdolMode, BrakeOnMode)

| PREVIOUS STATE | CONDITION | INPUT ACTION | NEXT STATE |
|---|---|---|---|
| (I, OFF) | — | EngineOn | (N, OFF) |
| (I, OFF) | — | BrakePushd | (I, ON) |
| (N, OFF) | — | BrakePushd | (N, ON) |
| (N, OFF) | — | EngineOff | (I, OFF) |
| (N, OFF) | — | activate | (C, OFF) |
| (N, OFF) | — | AccelOn | (N, OFF) |
| (C, OFF) | — | BrakePushd | (C, ON) |
| (C, OFF) | — | AccelOn | (C, OFF) |
| (C, ON) | — | BrakeReleased | (C, OFF) |
| (C, ON) | — | deactivate | (N, ON) |

In Table 14, as to the input action "AccelOn", the previous state is limited as {(N,OFF), (C,OFF)}. This represents an input restriction newly occurred, i.e., "AccelOn" action is called from outside when the brake is "OFF" (after "BrakeReleased" action).

Briefly, by comparing FSM4 (merging FSM2 and FSM3) with the input restriction of the cruise controller 51, between "BrakeReleased" action and "AccelOn" action (Originally, an order restriction does not exist because of independent-parallel operation), a new order restriction is acquired.

By replacing a restriction 1 (an output restriction of FSM4) with an input restriction of FSM4, following restriction 2 is acquired.

"AccelOn is certainly called, after BrakeReleased is called and before BrakePushed is called" (Restriction 2)

At S68, a behavioral specification and an input restriction of a high level hierarchy Z2 (merging the component set Z_1 and the component Z_0) is calculated. In this case, after the inconsistency between FSM4 and the input restriction of the cruise controller 51 is deleted at S67, from FSM4 and the behavioral specification (FSM) of the cruise controller 51, a behavioral specification of the high level hierarchy Z2 merging the component set Z_1 and the component Z_0 is calculated.

In this calculation, as to input/output action between the component set Z_1 and the component Z_0, in order not to occur unmatching (When one side outputs an action, the other side cannot input the action), combination of behaviors of the component set Z_1 and the component Z_0 is calculated. First, a direct product between a FSM of the component set Z_1 and a FSM of the component Z_0 is calculated, and a state S to occur the unmatching is specified from the direct product. By retroactively tracing a transition to reach the state S, the transition is pruned. This detail processing is disclosed in explanation of composition operation of the Non-patent reference 2. After the FSM is acquired, a behavioral specification of the FSM is acquired, and an input restriction is extracted from the behavioral specification.

At S69, it is decided that a component connected to the high level hierarchy Z2 does not exist (NO). The behavioral specification and the input restriction acquired sat S68 are registered as the behavioral specification and the input restriction of the high level hierarchy X (cruise control system) to the quality specification DB 14, with a test case based on this behavioral specification (and the input restriction). In this way, by combining a quality specification (the input restriction, the behavioral specification, the test case) of components of the low level hierarchy, a quality specification of the high level hierarchy can be calculated.

<Condition Propagation Unit 22>

According to a connection relationship of components described in the system specification 101, a condition propagation unit (control unit) 22 maintains a consistency of quality specification of all the system using the quality specification consistency verification unit 15, the input restriction calculation unit 16, the relaxed condition calculation unit 17, the tightened condition calculation unit 18 and the quality specification calculation unit 20 for high level hierarchy.

Figure 18:
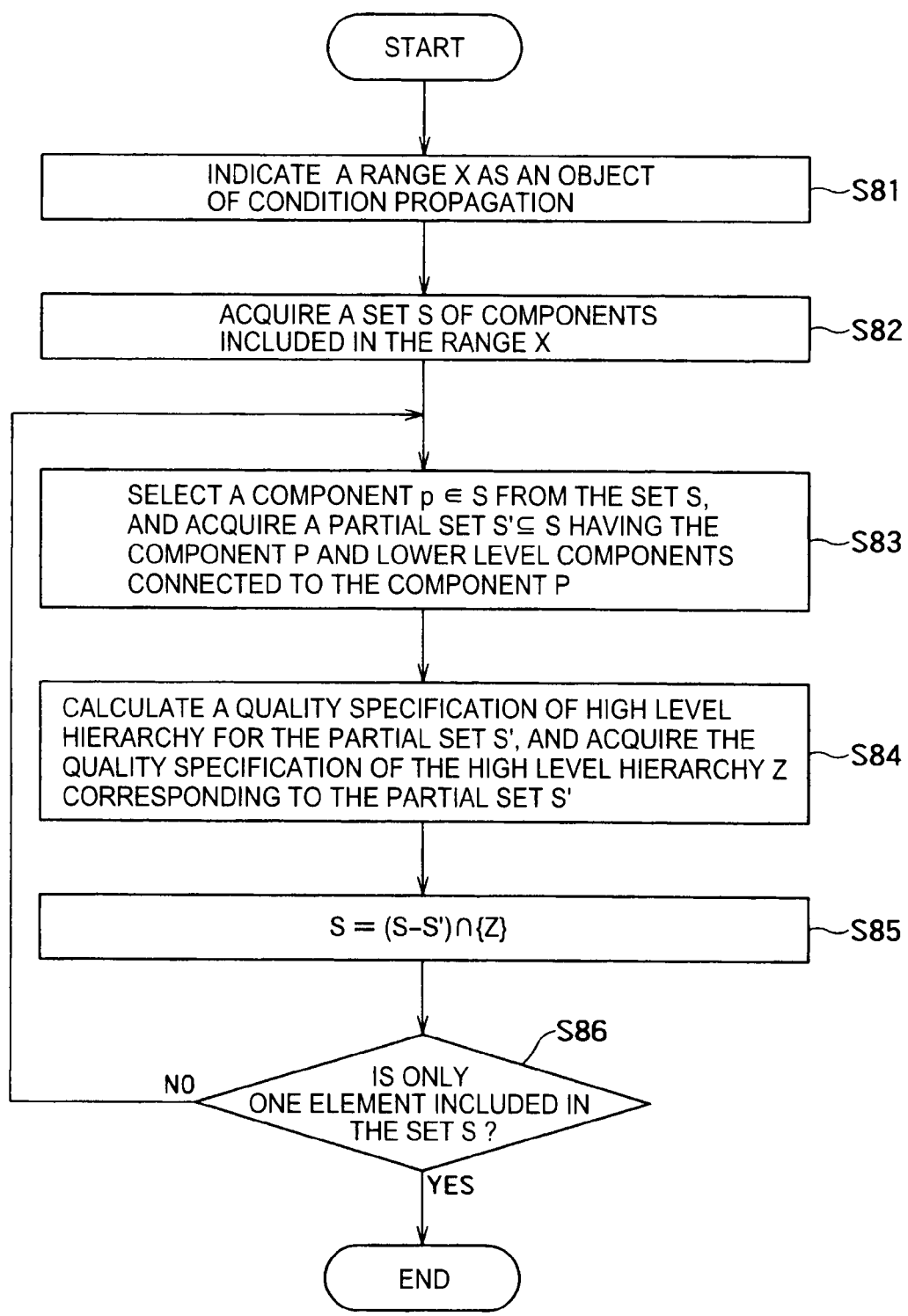
FIG. 18 is a flow chart of processing of a condition propagation unit.

FIG. 18 is a flow chart of processing of the condition propagation unit 22. Hereinafter, this processing is explained by referring to a system of FIG. 19 as one example.

Figure 19:
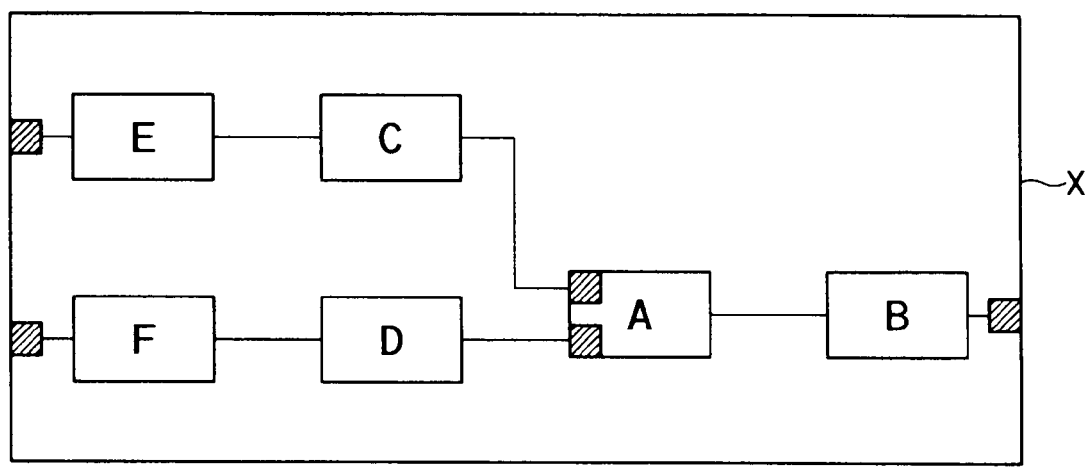
FIG. 19 is a schematic diagram of a system to explain the processing of FIG. 18.

At S81, a range X as an object of condition propagation is indicated. In this case, as shown in FIG. 19, a range including components A, B, C, D, E, F is indicated. At S82, a set S of components included in the range X is acquired. In this case, "S={A, B, C, D, E, F}" is acquired.

At S83, an arbitrary component p∈S is selected from the set S, and a partial set S' CS are acquired (S' comprises the component p and lower level components connected to the component p). In this case, a component B is selected from S={A, B, C, D, E, F}, and a partial set S'={A, B} is acquired (S' comprises the component B and a lower level component A connected to the lower level component B).

At S84, the quality specification calculation unit 20 calculates a quality specification for high level hierarchy of the partial set S'. As a result, a quality specification (a behavioral specification, an input restriction, a test case) of high level hierarchy Z corresponding to the partial set S' is calculated. In this case, a quality specification of high level hierarchy (named as AB) corresponding to the partial set S'={A, B} is calculated.

At S85, "S=(S−S')∩{Z}" is set, and processing of S83~S85 is repeated until the number of elements included in the set S is one (NO at S86). As to "S={AB, C, D, E, F}", "S'={AB, C, D}" is acquired at the first repeat step S83. At the next step S84, a quality specification of high level hierarchy (named as ABCD) corresponding to S' is calculated. At the next step S85, "S={ABCD,E,F}" is acquired. In the same way, "S'={ABCD, E, F}" is acquired at the second repeat step S83. At the next step S84, a quality specification of high level hierarchy (named as ABCDEF) corresponding to S' is calculated. At the next step S85, "S={ABCDEF}" is acquired. In this case, the number of elements included in the set S is one. Accordingly, the processing is completed.

<Testability Metrics Calculation Unit>

From the quality specification of each component (composing the system) and the system specification 101 (describing connection information among components), a testability metrics calculation unit 21 calculates a testability metrics between components connected. The testability metrics is calculated based on a consistency calculated by the quality specification consistency verification unit 15. As to two components A and B mutually connected, the testability metrics exist as following three kinds (">", "=", "<"). As to a test case of the component A and an input restriction of the component B as the object, Table 15 shows an example of the testability metrics. If a test case of the component B and an input restriction of the component A are the object, A and B are changed for definition explanation of each kind of the testability metrics in Table 15.

TABLE 15

Testability metrics

A">"B: In a test case of the component A, an individual test case including an action sequence rejecting an input restriction of the component B exists (i.e., inconsistency exists).

TABLE 15-continued

Testability metrics

A"<"B: An input restriction of the component B accepts all test cases of the component A, and can accept a larger number of behavioral traces (action sequences) than the number of test cases of the component A A"="B: An input restriction of the component B exactly accepts a test case of the component A. Alternatively, the components A and B are not mutually related for acceptance.

The testability metrics calculation unit 21 sum ups the testability metrics of each kind calculated between components connected, and displays (or outputs) the total. For example, the total is displayed (or outputted) by a following format.

TABLE 16

The total of the testability metrics in all the system

| | |
|---|---|
| The number of ">" | 2 |
| The number of "=" | 2 |
| The number of "<" | 0 |
| The number of combination of all connections | 2 |

Accordingly, a user can confirm a ratio of the testability metrics in all the system. For example, processing of the testability metrics calculation unit 21 is executed before processing of the condition propagation unit 22. As a result, if (A">"B) does not exist, processing of the condition propagation unit may be omitted. Alternatively, based on a request range from the condition propagation unit 22, the testability metrics calculation unit 21 may reply a processing result by processing of components included in the request range, and the condition propagation unit 22 may forward the processing using the processing result. For example, when (A">"B) does not exist, it may be decided that inconsistency in the range does not exist.

As to processing steps of the testability metrics calculation unit 21, first, the testability metrics (">", "=", ">") between components connected in the system is calculated ([1]). Next, by summing up the testability metrics of each kind, the total is displayed or outputted ([2]).

Hereinafter, by referring the cruise control system of FIG. 2 as one example, processing steps of the testability metrics calculation unit 21 are explained. A behavioral specification of the cruise controller 51 is given as the state transition table of FIG. 3, a behavioral specification of the engine controller 52 is given as the state transition table of FIG. 5, and a behavioral specification of the brake controller 53 is given as the state transition table of FIG. 6.

At a step [1], as explained in <Quality specification consistency verification unit 15>, between the cruise controller 51 and the engine controller 52, a test case rejected by a behavior of the engine controller 52 exists in test cases of the cruise controller 51. In this case, a testability metrics between these two controllers is calculated. First, as to the test case of the cruise controller 51 and the input restriction of the engine controller 52 as the object, the testability metrics is represented as follows.

The cruise controller 51 ">" The engine controller 52.

In the same way, as to the test case of the engine controller 52 and the input restriction of the cruise controller 51 as the object, the testability metrics is also calculated.

Furthermore, the testability metrics between the cruise controller 51 and the brake controller 53 is calculated. First, as to the test case of the cruise controller 51 and the input restriction of the brake controller 53 as the object, the testability metrics is represented as follows.

The cruise controller 51 ">" The brake controller 53

In the same way, as to the test case of the brake controller 53 and the input restriction of the cruise controller 51 as the object, the testability metrics is also calculated.

At a step [2], the testability metrics (In this case, four) are summed up for each kind, and the total of each kind is displayed or outputted.

<Assertion Generation Unit 23>

As to an input restriction of each component stored in the quality specification DB 14, an assertion generation unit 23 generates an assertion description requiring to satisfy the input restriction. An arbitrary description method is used as the assertion description. For example, "LTL" or "PSL" disclosed in following reference can be used.

"Assertion-Based Design (2nd Edition)", Harry D. Foster, Adam C. Krolnik and David J. Lacey, (Translated by T. Tohno, K. Okano and A. Nakata), Maruzen Co., September 2004

<Detect and Mitigate Specification Generation Unit 24>

A detect and mitigate specification generation unit 24 generates a detect specification to detect a regularity of the assertion description (generated by the assertion generation unit 23), and embeds the detect specification and the assertion description into the system specification 101. Furthermore, when the detect module detects an irregularity, the detect and mitigate specification generation unit 24 generates a mitigate module to mitigate the irregularity, and embeds the mitigate module into the system specification. As to generation of the detect module and the mitigate module, and embedding into the system specification 101, arbitrary method is used. For example, a technique disclosed in following reference can be used.

"Towards Model-Based Failure-Management for Automotive Software", V. Ermagan, J. Mizutani, K. Oguchi and D. Weir, Proceedings of the 4th International Workshop on Software Engineering for Automotive Systems, 2007

In this way, the detect and mitigate specification generation unit 24 generates a system specification having high reliability 104 by embedding the assertion description, the detect module specification and the mitigate module specification. By using the system specification having high reliability 104 and the quality specification DB 14, a test having high reliability is performed. For example, when an action violating the assertion description of each component or the system is inputted, the action is detected. In this case, Input of the action (occurrence of inconsistency) is prevented, and mitigate processing based on the violation is executed.

As mentioned-above, in the present embodiment, in case of composing a software or a hardware by combining components, or a system by combining the software and the hardware, a verification of not a partial suitable consistency but an entire suitable consistency can be realized.

Furthermore, as to two components mutually connected in the system comprising a plurality of components, it is verified whether a test case of one and the other of two components satisfies an input restriction of the other and one of the two components respectively. Accordingly, a consistency between two components mutually connected can be verified. In this method, even if a new component is added to the system, a consistency between the new component and another component adjacent to the new component can be easily verified.

Furthermore, in case of detecting an inconsistency between two adjacent components, in order not to occur the inconsistency, the inconsistency is corrected by tightening an input restriction of one component or relaxing an input restriction of the other component. By adaptively selecting tightness or relaxation of the input restriction, the inconsistency between two adjacent components in a system is deleted. As a result, all the inconsistency in the system can be deleted, and unnecessary increase of the number of test cases can be prevented.

Furthermore, as to two adjacent components not having the inconsistency, on condition that a test case of one component satisfies an input restriction of the other component, the input restriction of the other component is tightened. As a result, the number of test cases of the one component can be reduced.

Furthermore, in the present embodiment, a behavioral specification and an input restriction of a high level hierarchy combining a plurality of low level components is generated from a quality specification of each low level component. Accordingly, an input restriction of a behavior firstly occurred by combining low level components can be processed. In addition to this, a consistency or an inconsistency between the high level hierarchy and another component connected to the high level hierarchy can be verified.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

Other embodiments of the invention will be apparent to those skilled in the art from consideration of the specification and embodiments of the invention disclosed herein. It is intended that the specification and embodiments be considered as exemplary only, with the scope and spirit of the invention being indicated by the claims.

What is claimed is:

1. An apparatus for designing a system specification for testability, comprising:
    a first storage unit configured to store the system specification describing a connection among a plurality of components in a system, and input and output actions of each component for another component or outside of the system;
    a second storage unit configured to store a behavioral specification of each component, describing a transition between states by an input action, and an output action occurred with the transition;
    a third storage unit configured to store an input restriction of each component, describing an occurrence order of the input action;
    an action sequence acquisition unit configured to specify a state transition path covering transitions defined by the behavioral specification of a component to satisfy the input restriction of the component, and acquire output action sequences from the state transition path;
    a selection unit configured to select a pair of components connected in the system;
    a verification unit configured to verify whether an output action sequence of a first component as one of the pair satisfies an input restriction of a second component as the other of the pair;
    an input restriction correction unit configured to, when the output action sequence of the first component does not satisfy the input restriction of the second component, relax the input restriction of the second component so that the output action sequence of the first component satisfies a relaxed input restriction of the second component, or tighten an input restriction of the first component so that a new output action sequence of the first component satisfies the input restriction of the second component; and
    a control unit configured to control the selection unit, the verification unit and the input restriction correction unit, for each pair of components in the system, so that output action sequences of one and the other of a pair satisfies input restrictions of the other and the one of the pair respectively.

2. The apparatus according to claim 1, further comprising:
    a model generation unit configured to generate a state transition machine model representing a specification to restrict a transition included in the behavioral specification based on the input restriction of the component,
    wherein the model generation unit performs
    (1) selecting one component Z0 in the system by the selection unit,
    (2) specifying each component Z0_i connected to the component Z0 in the system,
    (3) correcting a connection relationship between the one component Z0 and each component Z0_i and a correction relationship between components Z0_i mutually connectable by the verification unit and the input restriction correction unit,
    (4) generating a behavioral specification of a component set Z1 by merging the state transition machine model of each component Z0_i,
    (5) correcting a connection relationship between the one component Z0 and the component set Z1 by the verification unit and the input restriction correction unit,
    (6) generating a behavioral specification of a higher level hierarchical component Z2 by merging each state transition machine model of the one component Z0 and the component set Z1,
    (7) repeating (1)~(6) for the system including the higher level hierarchical component Z2 and excluding the components Z0 and Z0_i,
    (8) when the number of components included in the system is one, storing in the second storage unit, a behavioral specification of the higher level hierarchical component Z2 last generated by completing (7).

3. The apparatus according to claim 1, wherein
the verification unit detects a NG action not satisfying the input restriction of the second component from the output action sequence of the first component, and
the input restriction correction unit specifies a previous state and an input action from which the NG action is outputted based on the behavioral specification of the first component, and corrects the input restriction of the first component to prohibit a transition by the input restriction from the previous state.

4. The apparatus according to claim 1, wherein
the verification unit detects a NG action not satisfying the input restriction of the second component from the output action sequence of the first component, and
the input restriction correction unit specifies a previous state from which the NG action is outputted based on the behavioral specification of the second component, verifies whether a transition by the NG action from the previous state exists in the behavioral specification of the second component, and, if existence, corrects the input restriction of the second component to permit the transition by the NG action from the previous state.

5. The apparatus according to claim 1, further comprising:
an input restriction tightness unit configured to, when the input restriction of the second component is satisfied, tighten the input restriction of the second component to restrict a transition included in the behavioral specification of the second component on condition that the output action sequence of the first component satisfies the input restriction of the second component.

6. The apparatus according to claim 1, further comprising
an input restriction extraction unit configured to extract the input restriction of each component from the behavioral specification of the component or an external memory apparatus, and store in the third storage unit, the input restriction of each component extracted.

7. The apparatus according to claim 2, wherein
the control unit extracts an input restriction of the system from a behavioral specification of the system, and stores in the third storage unit, the input restriction.

8. The apparatus according to claim 7, further comprising
an assertion generation unit configured to generate an assertion description requiring to satisfy the input restriction of each component or the system stored in the third storage unit after processing by the control unit is completed, and add the assertion description to the system specification.

9. The apparatus according to claim 8, further comprising
a module generation unit configured to generate a specification of a detect module to detect a regularity of the assertion description, and a specification of a mitigate module to execute mitigate processing based on contents of an irregularity when the irregularity is detected by the detect module, and adds the specifications of the detect module and the mitigate module to the system specification.

10. A method for designing a system specification for testability, comprising:
storing the system specification describing a connection among a plurality of components in a system, and input and output actions of each component for another component or outside of the system;
storing a behavioral specification of each component, describing a transition between states by an input action, and an output action occurred with the transition;
storing an input restriction of each component, describing an occurrence order of the input action;
specifying a state transition path covering transitions defined by the behavioral specification of a component to satisfy the input restriction of the component;
acquiring output action sequences from the state transition path;
selecting a pair of components connected in the system;
verifying whether an output action sequence of a first component as one of the pair satisfies an input restriction of a second component as the other of the pair;
relaxing the input restriction of the second component so that the output action sequence of the first component satisfies a relaxed input restriction of the second component, or tightening an input restriction of the first component so that a new output action sequence of the first component satisfies the input restriction of the second component, when the output action sequence of the first component does not satisfy the input restriction of the second component; and
controlling the selecting step, the verifying step, and the relaxing step or the tightening step, for each pair of components in the system, so that output action sequences of one and the other of a pair satisfies input restrictions of the other and the one of the pair respectively.

11. A computer readable medium storing program codes for causing a computer to design a system specification for testability, the program codes comprising:
a first program code to store the system specification describing a connection among a plurality of components in a system, and input and output actions of each component for another component or outside of the system;
a second program code to store a behavioral specification of each component, describing a transition between states by an input action, and an output action occurred with the transition;
a third program code to store an input restriction of each component, describing an occurrence order of the input action;
a fourth program code to specify a state transition path covering transitions defined by the behavioral specification of a component to satisfy the input restriction of the component;
a fifth program code to acquire output action sequences from the state transition path;
a sixth program code to select a pair of components connected in the system;
a seventh program code to verify whether an output action sequence of a first component as one of the pair satisfies an input restriction of a second component as the other of the pair;
an eighth program code to relax the input restriction of the second component so that the output action sequence of the first component satisfies a relaxed input restriction of the second component, or tighten an input restriction of the first component so that a new output action sequence of the first component satisfies the input restriction of the second component, when the output action sequence of the first component does not satisfy the input restriction of the second component; and
a ninth program code to control the sixth program code, the seventh program code, and the eighth program code, for each pair of components in the system, so that output action sequences of one and the other of a pair satisfies input restrictions of the other and the one of the pair respectively.

\* \* \* \* \*